(12) United States Patent
Ishiga

(10) Patent No.: US 8,265,412 B2
(45) Date of Patent: Sep. 11, 2012

(54) IMAGE PROCESSING METHOD

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 456 days.

(21) Appl. No.: 12/458,640

(22) Filed: Jul. 17, 2009

(65) Prior Publication Data

US 2009/0290808 A1    Nov. 26, 2009

Related U.S. Application Data

(63) Continuation of application No. PCT/JP2008/051651, filed on Feb. 1, 2008.

(30) Foreign Application Priority Data

Feb. 2, 2007    (JP) .................................. 2007-024065

(51) Int. Cl.
G06K 9/40    (2006.01)
H04N 5/208    (2006.01)
H04N 1/407    (2006.01)

(52) U.S. Cl. ........ 382/260; 382/274; 348/252; 358/3.27

(58) Field of Classification Search .................. 382/254, 382/260, 261, 274, 275, 305, 312, 240, 263–264, 382/266; 358/3.27, 1.2, 519, 532; 348/252, 348/254; 345/604, 611; 375/240.19, 240.21, 375/254

See application file for complete search history.

(56) References Cited

U.S. PATENT DOCUMENTS

| | | | |
|---|---|---|---|
| 6,055,340 A | 4/2000 | Nagao | |
| 6,373,992 B1 | 4/2002 | Nagao | |
| 6,667,815 B1 | 12/2003 | Nagao | |
| 6,754,398 B1 * | 6/2004 | Yamada | 382/260 |
| 7,386,158 B2 * | 6/2008 | Yamada | 382/132 |
| 7,626,592 B1 * | 12/2009 | Vuylsteke | 345/589 |
| 7,742,652 B2 * | 6/2010 | Oh et al. | 382/260 |
| 7,889,943 B1 * | 2/2011 | Christian | 382/275 |
| 7,916,187 B2 * | 3/2011 | Tsuruoka | 348/241 |
| 2008/0089601 A1 | 4/2008 | Ishiga | |
| 2008/0095431 A1 | 4/2008 | Ishiga | |
| 2008/0123999 A1 | 5/2008 | Ishiga | |
| 2008/0152253 A1 * | 6/2008 | Thompson | 382/264 |

(Continued)

FOREIGN PATENT DOCUMENTS

JP    A-2006-309749    11/2006

(Continued)

OTHER PUBLICATIONS

Japanese Office Action issued in Japanese Application No. 2008-556196 dated May 17, 2011 (with translation).

(Continued)

*Primary Examiner* — Kanjibhai Patel
(74) *Attorney, Agent, or Firm* — Oliff & Berridge, PLC

(57) ABSTRACT

An image processing method for removing a noise component contained in an original image includes: smoothing a noise component contained in an original image on a temporary basis by using a noise fluctuation index value; extracting a temporary noise component free of a non-noise component based upon a differential signal representing a difference between the original image and a smoothed image; extracting an actual noise component by further excluding a component less likely to be a noise component from the extracted temporary noise component by comparing the extracted temporary noise component with the noise fluctuation index value again; and removing noise from the original image based upon the extracted actual noise component having been extracted.

24 Claims, 11 Drawing Sheets

U.S. PATENT DOCUMENTS

| | | | | |
|---|---|---|---|---|
| 2008/0199100 A1* | 8/2008 | Ishiga | .......................... | 382/263 |
| 2009/0021611 A1* | 1/2009 | Utsugi | .......................... | 348/241 |
| 2009/0040386 A1 | 2/2009 | Ishiga | | |
| 2009/0046943 A1 | 2/2009 | Ishiga | | |
| 2009/0290808 A1* | 11/2009 | Ishiga | .......................... | 382/261 |

FOREIGN PATENT DOCUMENTS

| | | |
|---|---|---|
| JP | A-2006-310999 | 11/2006 |
| WO | WO 2006/064913 A1 | 6/2006 |
| WO | WO 2006/068025 A1 | 6/2006 |
| WO | WO 2006/106919 A1 | 10/2006 |

OTHER PUBLICATIONS

Lee, "Digital Image Smoothing and the Sigma Filter," *Computer Vision, Graphics, and Image Processing*, 1983, vol. 24, pp. 255-269.

Tomasi et al., "Bilateral Filtering for Gray and Color Images," Proceedings of the 1998 IEEE International Conference on Computer Vision, 1998.

Choudhury et al., "The Trilateral Filter for High Contrast Images and Meshes," Eurographics Symposium on Rendering 2003, pp. 1-11.

Harashima et al., "ϵ-Separating Nonlinear Digital Filter and its application," The Transactions of the Institute of Electronics, Information and Communication Engineers, 1982, vol. J65-A, No. 4, pp. 297-304.

\* cited by examiner

IMAGE PROCESSING METHOD

This application is a continuation of International Application No. PCT/JP2008/051651 filed Feb. 1, 2008.

INCORPORATION BY REFERENCE

The disclosures of the following priority application and International Application are herein incorporated by reference: Japanese Patent Application No. 2007-024065 filed Feb. 2, 2007; and International Application No. PCT/JP2008/051651 filed Feb. 1, 2008.

BACKGROUND OF THE INVENTION

1. Field of the Invention

The present invention relates to an image processing method that may be adopted to remove noise contained in an image.

2. Description of Related Art

The smoothing technologies adopted for noise removal in the related art include noise removal filters referred to as edge-preserving smoothing filters that assure adaptive smoothing with edge structures retained intact by comparing the noise fluctuation width with a differential value representing the difference between pixels. Such edge-preserving smoothing filters include the $\epsilon$ filter disclosed in non-patent reference 1, the $\sigma$ filter disclosed in non-patent reference 2, the bilateral filter disclosed in non-patent reference 3 and the trilateral filter disclosed in non-patent reference 4, the latter two of which assure higher levels of performance.

Nonpatent reference 1: H. Harashima et al., "$\epsilon$-Separating Nonlinear Digital Filter and Its Application", The Transactions of the Institute of Electronics, Information and Communication Engineers, April/1982 issue, vol. J65-A No. 4, pp. 297-304

Nonpatent reference 2: J. S. Lee, "Digital Image Smoothing and the Sigma Filter", Computer Vision, Graphics and Image Processing, vol. 24, pp. 255-269, 1983

Nonpatent reference 3: C. Tomasi et al., "Bilateral Filtering for Gray and Color Images" Proceedings of the 1998 IEEE International Conference on Computer Vision, Bombay, India Nonpatent reference 4: Prasun Choudhury et al., "The Trilateral Filter for High Contrast Images and Meshes", Eurographics Symposium on Rendering 2003, pp. 1-11

SUMMARY OF THE INVENTION

While all these edge-preserving smoothing filters assure high levels of edge structure preserving performance for an edge structure assuming a stepped contour or adjacent to a primarily flat area, they do not guarantee successful edge structure preservation over an area where steep edge structures overlap in a complicated manner so as to render three-dimensional depth perception or an area such as a textured area where edge structures change drastically. Thus, there is still a challenge to be effectively addressed in that as the edge structure component in these areas becomes lost through smoothing, the resulting smoothed image will be flat and lack three-dimensional depth.

According to the 1st aspect of the present invention, an image processing method for removing a noise component contained in an original image, comprises: smoothing a noise component contained in an original image on a temporary basis by using a noise fluctuation index value; extracting a temporary noise component free of a non-noise component based upon a differential signal representing a difference between the original image and a smoothed image; extracting an actual noise component by further excluding a component less likely to be a noise component from the extracted temporary noise component by comparing the extracted temporary noise component with the noise fluctuation index value again; and removing noise from the original image based upon the extracted actual noise component having been extracted.

According to the 2nd aspect of the present invention, an image processing method for removing a noise component contained in an original image, comprises: adaptively smoothing a noise component contained in an original image by distinguishing the noise component from an edge component present within a smoothing target area through comparison of a noise fluctuation index value and a spatial fluctuation width over which original image signals fluctuate; extracting a temporary noise component based upon a differential signal representing a difference between the original image and an image resulting from adaptive smoothing; statistically re-examining a distribution of the temporary noise component having been extracted by comparing the extracted temporary noise component with the noise fluctuation index value again; extracting an actual noise component by further excluding a component less likely to be a noise component from the extracted temporary noise component based upon examination results; and removing noise from the original image based upon the actual noise component having been extracted.

According to the 3rd aspect of the present invention, in the image processing method according to the 1st aspect, it is preferred that the noise fluctuation index value is uniquely determined in correspondence to the original image.

According to the 4th aspect of the present invention, in the image processing method according to the 1st aspect, it is preferred that a probability with which the component less likely to be a noise component is present in the extracted temporary noise component is estimated to be higher when the extracted temporary noise component indicates a greater value relative to the noise fluctuation index value.

According to the 5th aspect of the present invention, in the image processing method according to the 4th aspect, it is preferred that a mixing ratio of the component less likely to be a noise component is statistically estimated based upon a Gaussian distribution probability assuming an argument represented by a ratio of the extracted temporary noise component and the noise fluctuation index value.

According to the 6th aspect of the present invention, in the image processing method according to the 4th aspect, it is preferred that the component less likely to be a noise component is eliminated by attenuating the extracted temporary noise component by multiplying the component less likely to be a noise component by the Gaussian distribution probability.

According to the 7th aspect of the present invention, an image processing method for removing a noise component contained in an original image, comprises: smoothing an original image by using a specific noise model having a distribution function; extracting a temporary noise component based upon a differential signal representing a difference between the original image and the image having been smoothed; estimating a quantity of false noise component present in the temporary noise component having been extracted by comparing a value indicated for the temporary noise component with the distribution function of the specific noise model; extracting an actual noise component by excluding the false noise component in the estimated quantity from the temporary noise component; and removing noise from the original image based upon the actual noise component having been extracted.

According to the 8th aspect of the present invention, in the image processing method according to the 7th aspect, it is preferred that the distribution function of the specific noise model used in extraction of the temporary noise component and the distribution function of the noise model used in estimation of the quantity of the false noise component are common distribution functions interlocking with each other by assuming a single fluctuation index value.

According to the 9th aspect of the present invention, in the image processing method according to the 8th aspect, it is preferred that the quantity of false noise component present in the temporary noise component is estimated by determining whether or not the value of the noise component is greater than the fluctuation index value.

According to the 10th aspect of the present invention, in the image processing method according to the 7th aspect, it is preferred that the distribution function used in the specific noise model is a Gaussian distribution model with Gaussian noise distributed over a reference width represented by the fluctuation index value.

According to the 11th aspect of the present invention, in the image processing method according to the 7th aspect, it is preferred that the distribution function used in the specific noise model is a threshold value distribution model with noise distributed in a pattern represented by a stepped function with the fluctuation index value defining a cutoff point.

According to the 12th aspect of the present invention, in the image processing method according to the 1th aspect, it is preferred that the original image is a band-limited subband image expressed with multiresolution image representations.

According to the 13th aspect of the present invention, in the image processing method according to the 1st aspect, it is preferred that the original image is the actual original image expressed in an actual space.

According to the 14th aspect of the present invention, an image processing method for removing a noise component contained in an original image, comprises: generating a plurality of band-limited images assuming gradually lowered resolution levels by filtering the original image; extracting a noise component free of a non-noise component in each band-limited image by executing noise removal processing by comparing the band-limited image with a noise fluctuation index value determined in correspondence to the band-limited image; synthesizing noise component signals having been extracted from the band-limited images to generate a noise component assuming a resolution level matching the resolution level of the original image; estimating a quantity of a false noise component present in the synthesized noise component by comparing a level of the synthesized noise component with the noise fluctuation index value determined in correspondence to the original image again; extracting an actual noise component by excluding the false noise component from the synthesized noise component based upon estimation results; and removing noise from the original image based upon the actual noise component having been extracted.

According to the 15th aspect of the present invention, in the image processing method according to the 14th aspect, it is preferred that a probability of the false noise component being present in the synthesized noise component is estimated to be higher when a level of the synthesized noise component is higher relative to the noise fluctuation index value determined uniquely in correspondence to the original image.

According to the 16th aspect of the present invention, in the image processing method according to the 15th aspect, it is preferred that a mixing ratio with which the false noise component is present in the synthesized noise component is statistically estimated based upon a Gaussian distribution probability assuming an argument represented by a ratio of the synthesized noise component and the noise fluctuation index value uniquely determined in correspondence to the original image.

According to the 17th aspect of the present invention, in the image processing method according to the 15th aspect, it is preferred that the false noise component is excluded by attenuating the false noise component by multiplying the synthesized noise component by the Gaussian distribution probability.

According to the 18th aspect of the present invention, in the image processing method according to the 14th aspect, it is preferred that: the plurality of band-limited images make up a set of high-frequency subband images and low-frequency subband images, assuming sequentially lowered resolution levels; and the synthesized noise component is generated by synthesizing noise component signals extracted from two types of band-limited images at each of the resolution levels.

According to the 19th aspect of the present invention, in the image processing method according to the 14th aspect, it is preferred that: the image processing method further comprises: estimating the quantity of false noise component present in the noise component by comparing the level of the noise component free of a non-noise component, having been extracted in correspondence to each of the band-limited images, with the noise fluctuation index value determined in correspondence to the band-limited image again; extracting the actual noise component in each band-limited image by excluding the false noise component from the noise component based upon estimation results; and synthesizing individual actual noise component signals having been extracted so that verification is executed to exclude the false noise component twice by excluding the false noise component in each band-limited image prior to noise component synthesis and also by excluding the false noise component at a resolution level matching the resolution of the original image following the noise component synthesis.

According to the 20th aspect of the present invention, in the image processing method according to the 4th aspect, it is preferred that a mixing ratio with which the false noise component is present is estimated based upon a Gaussian distribution probability assuming an argument represented by a ratio of the noise component and a value six times the noise fluctuation index value.

According to the 21st aspect of the present invention, in the image processing method according to the 1st aspect, it is preferred that the original image is smoothed by using a weighted averaging filter assuming a weighting coefficient adjusted in correspondence to a pixel differential value representing a difference between a target pixel and a nearby pixel.

According to the 22nd aspect of the present invention, in the image processing method according to the 1st aspect, it is preferred that the original image is smoothed by extracting an edge in the original image, separating a noise component signal contained in an edge component signal and subtracting the noise component signal having been separated from the original image.

According to the 23rd aspect of the present invention, in the image processing method according to the 1st aspect, it is preferred that a luminance plane image and a chrominance plane image constitute the original image.

According to the 24th aspect of the present invention, in the image processing method according to the 1st aspect, it is preferred that a uniform index value is used as the noise fluctuation index value irrespective of a brightness level of the original image by converting the original image to an image in a uniform noise space or an image in a uniform color•uniform noise space.

According to the 25th aspect of the present invention, a computer-readable computer program product contains an image processing program enabling a computer or an image processing apparatus to execute an image processing method according to the 1st aspect.

According to the 26th aspect of the present invention, an image processing apparatus comprises a control device that executes an image processing method according to the 1st aspect.

According to the 27th aspect of the present invention, an electronic camera comprises a control device that executes an image processing method according to the 1st aspect.

DESCRIPTION OF PREFERRED EMBODIMENTS

First Embodiment

Figure 1:
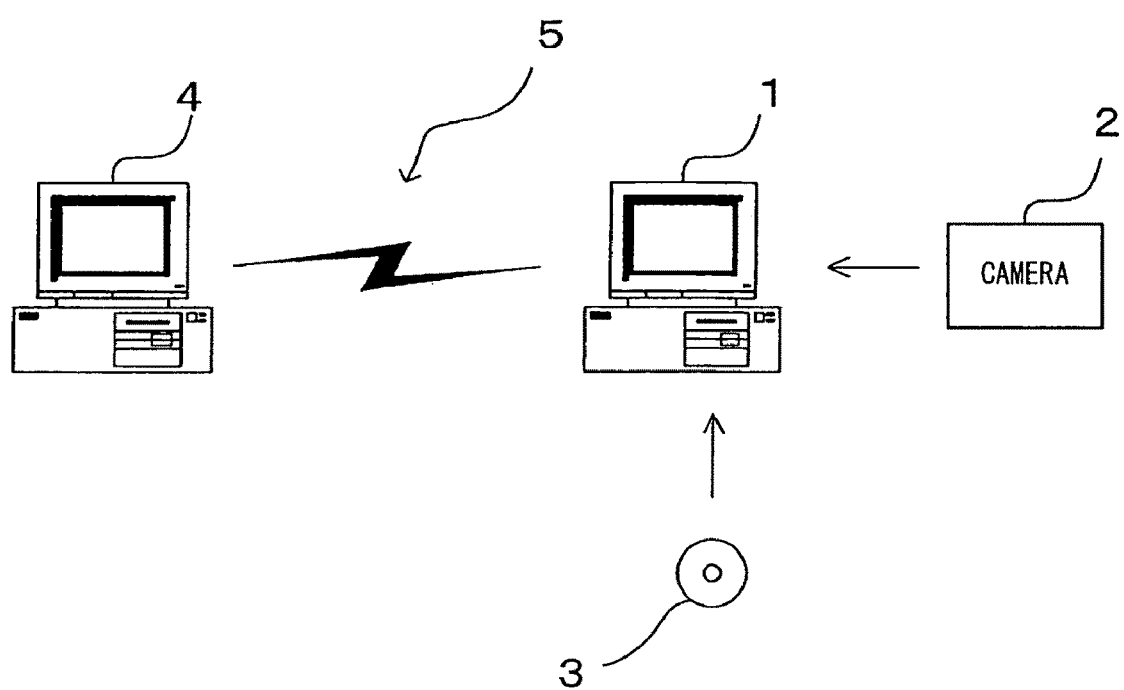
FIG. 1 shows an image processing apparatus achieved in an embodiment of the present invention.

FIG. 1 shows the image processing apparatus achieved in an embodiment of the present invention. The image processing apparatus is constituted with a personal computer 1. The personal computer 1, which is connected with a digital camera 2, a recording medium 3 such as a CD-ROM, another computer 4 and the like, is able to receive various types of image data. The personal computer 1 executes the image processing to be explained below on the image data provided thereto. The personal computer 1 is connected to the computer 4 via an electronic communication network 5, which may be the Internet.

Figure 9:
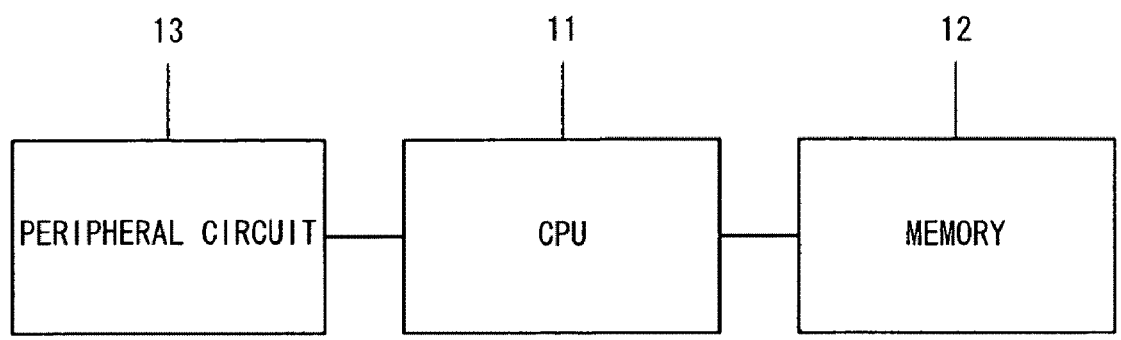
FIG. 9 shows the structure of the personal computer.

The program that enables the computer 1 to execute the image processing is provided in a recording medium such as a CD-ROM or by another computer via the Internet or another electronic communication network connected to the personal computer in a manner similar to that shown in FIG. 1. The program thus provided is installed within the personal computer 1. FIG. 9 shows the structure of the personal computer 1. The personal computer 1 comprises a CPU 11, a memory 12 and a peripheral circuit 13 and the like. The installed program is executed by the CPU 11.

The program to be provided via the Internet or another electronic communication network is converted to and transmitted as a signal on a carrier wave transmitted through the electronic communication network, i.e., a transmission medium. Namely, the program can be distributed as a computer-readable computer program product adopting any of various modes including a recording medium and a carrier wave.

Figure 2:
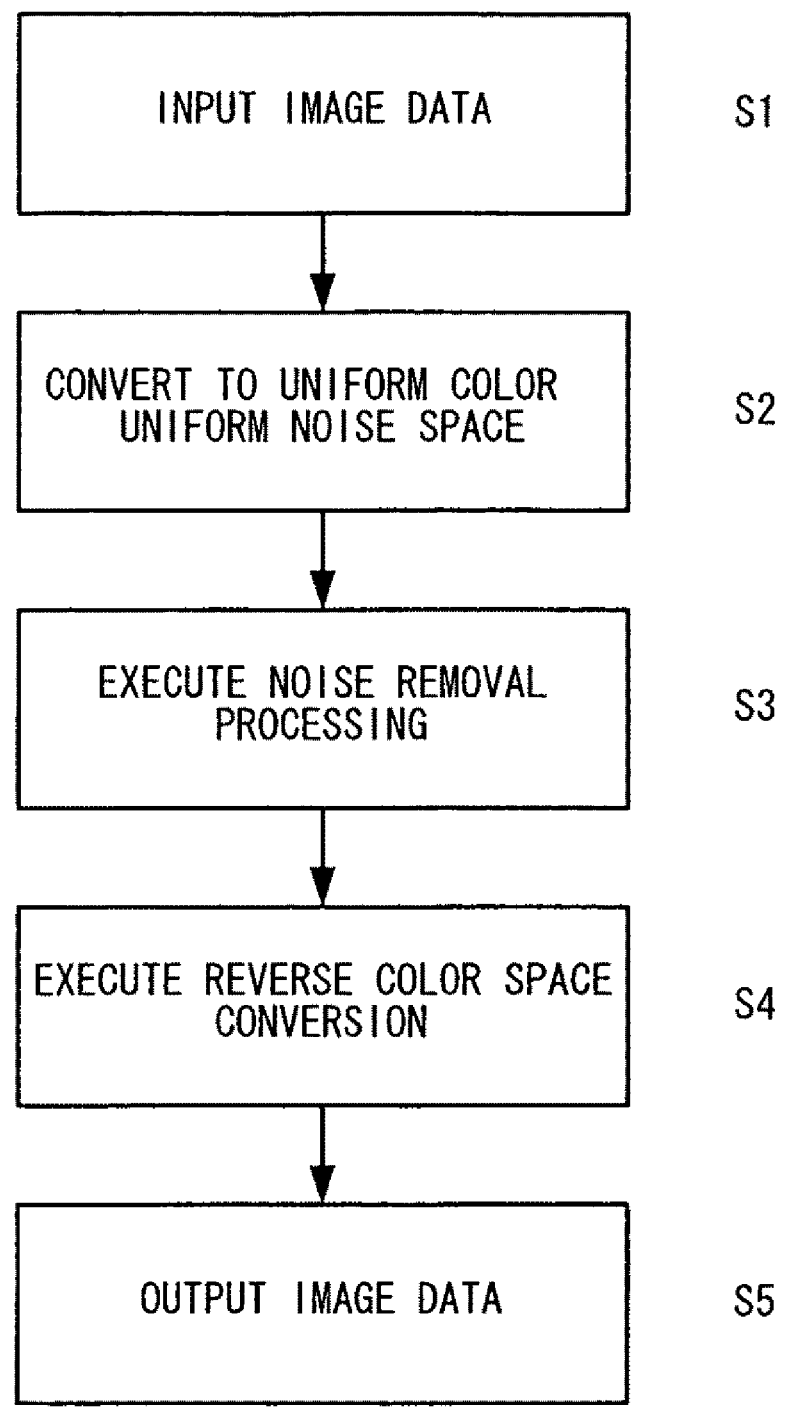
FIG. 2 presents a flowchart of the image processing executed by the personal computer 1 in a first embodiment.

The following is a description of the image processing executed in the personal computer 1. FIG. 2 presents a flowchart of the image processing executed by the personal computer 1 in the first embodiment. In step S1, image data are input. In step S2, the image data are converted to data in a uniform color uniform noise space. In step S3, noise removal processing is executed. In step S4, color space reverse conversion is executed. In step S5, the image data resulting from the processing are output. The processing executed in the individual steps is now described in detail.

1. Color Space Conversion

After the image data (hereafter simply referred to as an image) are input in step S1, the input image undergoes color space conversion and thus is projected into an image processing space optimal for the noise removal processing in step S2. Such an image processing space may be, for instance, the uniform color•uniform noise space disclosed in International Publication No. 2006/064913 pamphlet (proposed by the inventor of the present invention). The input image is usually expressed in a standard color space such as the sRGB color space. Accordingly, the following explanation is provided by assuming that the input image is an sRGB image having undergone color correction processing, gamma correction processing and the like.

1-1 Reverse Gamma Correction

The gradation conversion, having been executed to achieve gamma characteristics conforming to the sRGB specifications or the unique gamma characteristics assumed by the camera manufacturer in conjunction with its proprietary image creation technology, is undone so as to convert the data back to the initial linear gradation data. The sRGB image is converted back to the initial linear gradation data through reverse gamma correction as expressed below. If the manufacturer-inherent gamma characteristics cannot be ascertained, reverse conversion for gamma characteristics conforming to the sRGB specifications may substitute for $\gamma^{-1}$.

$$R_{sRGB}{}^{linear} = \gamma^{-1}(R_{sRGB})$$

$$G_{sRGB}{}^{linear} = \gamma^{-1}(G_{sRGB})$$

$$B_{sRGB}{}^{linear} = \gamma^{-1}(B_{sRGB}) \qquad \text{[Expression 1]}$$

1-2 Conversion from RGB Color Space to XYZ Color Space

Next, the RGB color space data having been converted back to the linear gradation data are converted to data in the XYZ color space. This conversion is executed through a specific 3×3 matrix conversion, which is determined in correspondence to the spectral characteristics of the RGB reference color stimuli. For instance, the sRGB input image having been converted back to linear gradation data may undergo the following standard conversion.

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{sRGB}^{linear} \\ G_{sRGB}^{linear} \\ B_{sRGB}^{linear} \end{pmatrix} \qquad \text{[Expression 2]}$$

1-3 Conversion from XYZ Color Space to Uniform Color•Uniform Noise Color Space (L^a^b^)

Next, the data in the XYZ space are converted to a nonlinear gradation L^a^b^ space representing a perceptive attribute with a pseudo-uniform color distribution. The L^a^b^ space is defined in the description of the embodiment as a space obtained by modifying the uniform color space L*a*b* in the related art in consideration of noise uniformity and, for the sake of convenience, is referred to as L^a^b^.

$$\hat{L} = 100 \cdot f\left(\frac{Y}{Y_0}\right)$$ [Expression 3]

$$\hat{a} = 500\left\{f\left(\frac{X}{X_0}\right) - f\left(\frac{Y}{Y_0}\right)\right\}$$

$$\hat{b} = 200\left\{f\left(\frac{Y}{Y_0}\right) - f\left(\frac{Z}{Z_0}\right)\right\}$$

The gradation characteristics used to achieve uniform color•uniform noise in this process are usually expressed as;

$$f(t) = \frac{\sqrt{t+\varepsilon} - \sqrt{\varepsilon}}{\sqrt{1+\varepsilon} - \sqrt{\varepsilon}}$$ [Expression 4]

However, the expression above may be modified as expressed below by applying a positive offset value to the ⅓ power gamma characteristics of the CIE-compliant L*a*b* space, so as to achieve gradation characteristics with noise uniformity.

$$f(t) = \frac{\sqrt[3]{t+\varepsilon} - \sqrt[3]{\varepsilon}}{\sqrt[3]{1+\varepsilon} - \sqrt[3]{\varepsilon}}$$ [Expression 5]

X0, Y0 and Z0 in the expressions above each represent a value determined in correspondence to the illuminating light. For instance, X0, Y0 and Z0 may assume values 95.045, 100.00 and 108.892 respectively in a 2° visual field under standard light D65. While ε assumes a value dependant upon the specific sensor in use, a value very close to zero, for instance, will be assumed when a low sensitivity setting is selected and a value approximately equal to 0.05 will be assumed when a high sensitivity setting is selected.

2 Multiresolution Image Representation

Figure 3A:
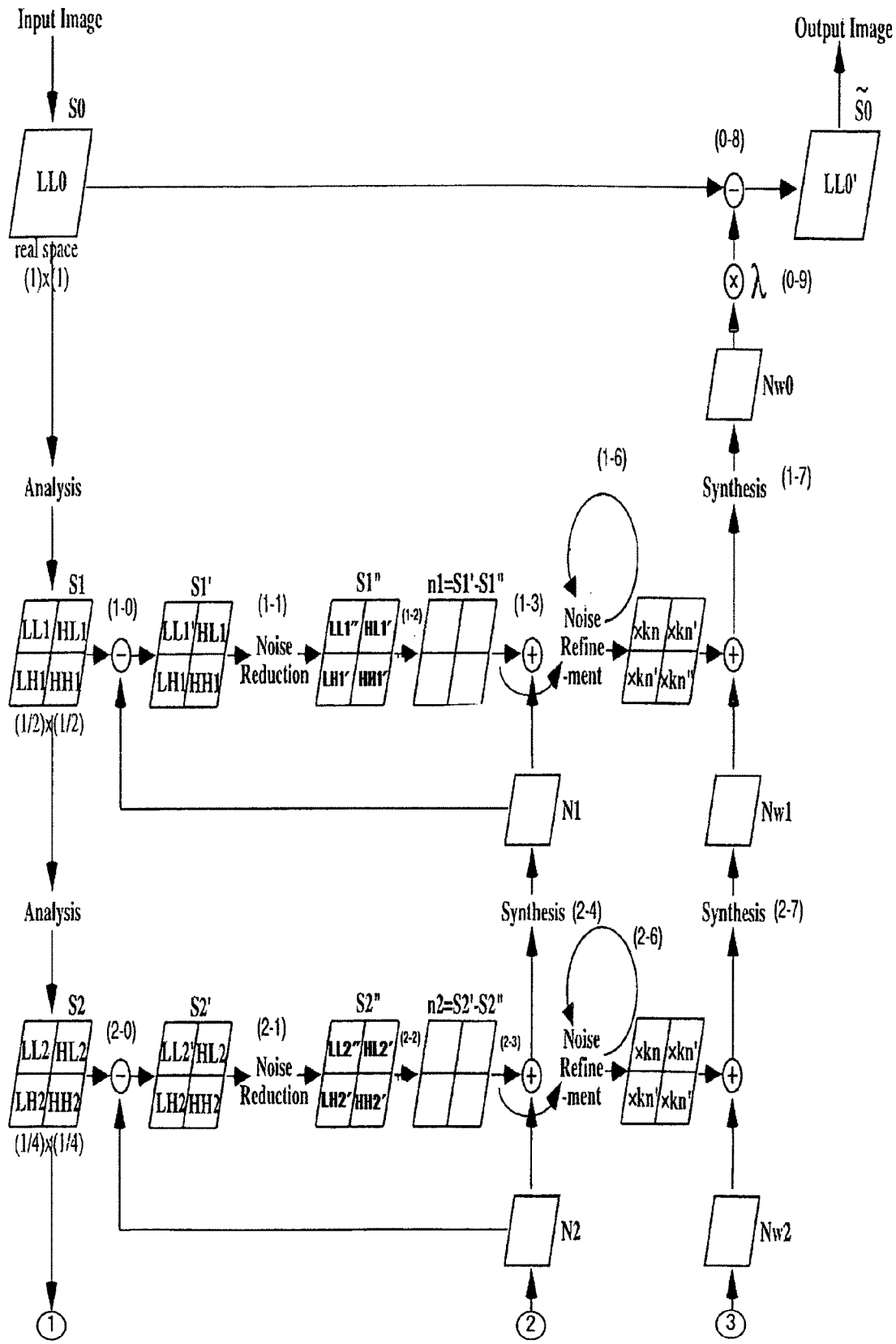
FIGS. 3A-3B present a flowchart of the noise removal processing executed based upon multiresolution image representations.
Figure 3B:
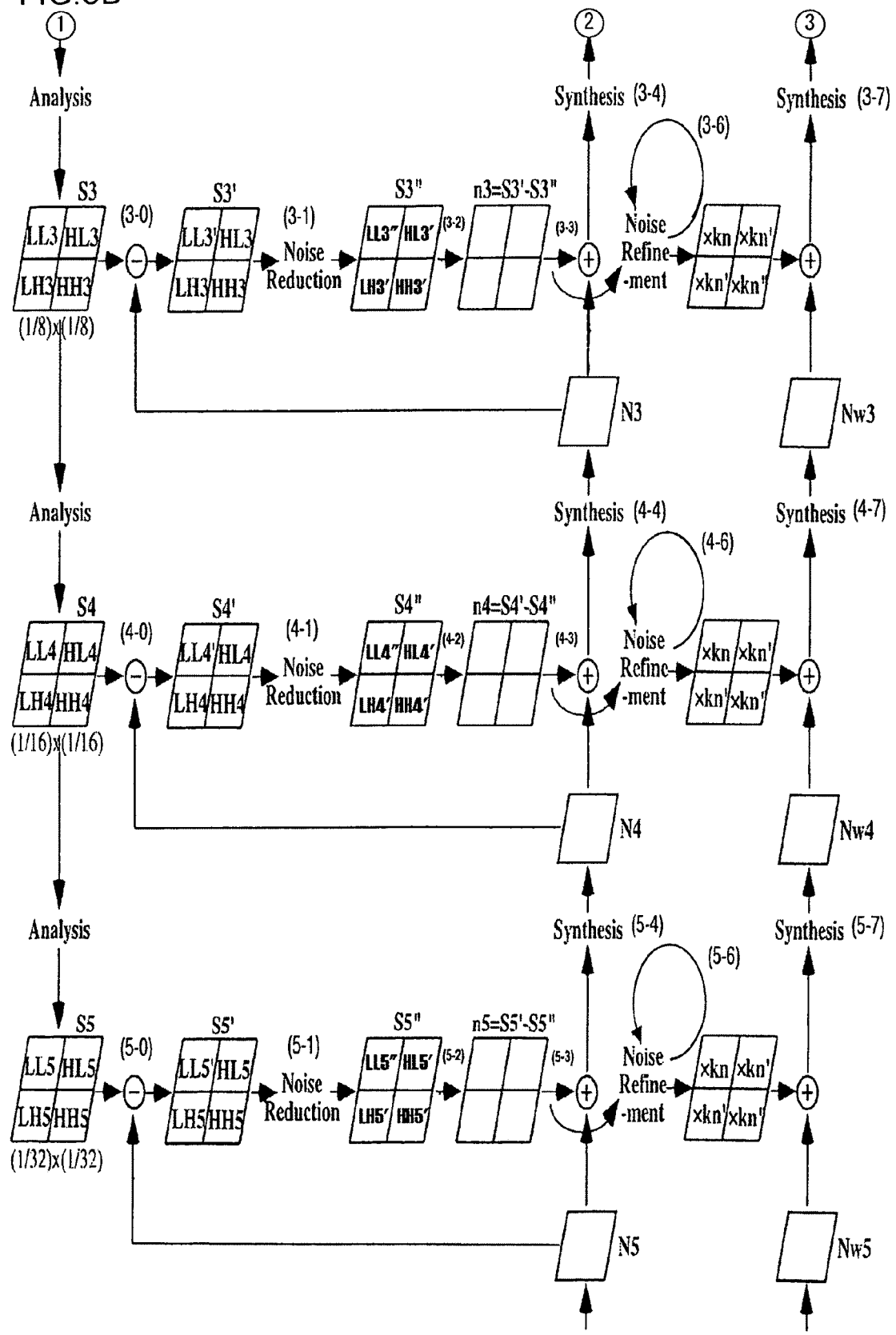

Next, the noise removal processing executed in step S3 is explained. FIGS. 3A-3B present a flowchart of the noise removal processing executed based upon multiresolution image representations in the embodiment. Namely, the original images corresponding to the luminance component L^, the chrominance (color difference) components a^ and b^ resulting from the data conversion to the uniform color•uniform noise color space described above are rendered in multiple resolution levels and then they individually undergo noise removal independently of one another. The analysis phase of sequential wavelet transformation, through which subband images are generated by decomposing each original image into lower resolution images, is summarized in the expression below.

$$V_{ij}(\vec{x}) = \text{Wavelet}_{(i,j)}\{S(\vec{x})\}_{j=LL, LH, HL, HH}^{i=1, 2, \ldots, 5 \text{ (resolution)}}$$ [Expression 6]

It is to be noted that a subband image Vij(x, y) is generated with S(x, y) in correspondence to each of the L^a^b^ planes.

It is also to be noted that in the wavelet transformation, through which an image (image data) is transformed to frequency component data, the frequency component in the image is divided into a high-pass component and a low-pass component. Data made up of the high-pass component referred to as a high-frequency subband, whereas data made up of the low-pass component are referred to as a low-frequency subband. The LL component data are low-frequency subband data, whereas the LH, HL and HH data are high-frequency subband data. Also, a low-frequency subband may be referred to as a low-frequency image and a high-frequency subband may be referred to as a high-frequency image. Furthermore, each subband may be referred to as a frequency band-limited image. A low-frequency subband is an image with band limits imposed upon the frequency band of the original image toward the low-frequency side, whereas a high-frequency subband is an image with band limits imposed upon the frequency band of the original image toward the high-frequency side.

While only the high-frequency subbands, obtained by sequentially decomposing the low-frequency subband LL component, are simply retained in the standard multiresolution transformation, the embodiment adopts multiple resolution levels whereby both the low-frequency subband LL and the high-frequency subbands LH, HL and HH are retained, so as to ensure that the noise component is always extracted from one subband frequency range to another.

The wavelet transformation may be executed by using, for instance, the 5/3 filter described below.

(Wavelet Transformation: Analysis/Decomposition Process)

high-pass component: $d[n]=x[2n+1]-(x[2n+2]+x[2n])/2$ low-pass component: $s[n]=x[2n]+(d[n]+d[n-1])/4= (-x[2n-2]+2x[2n-1]+6x[2n]+2x[2n+1]-x[2n+2])/8$ The one-dimensional wavelet transformation defined as described above is executed along the horizontal direction and the vertical direction independently through two-dimensional separation filtering processing so as to achieve wavelet decomposition. The coefficient s is directed onto the L plane, whereas the coefficient d is directed onto the H plane.

(Inverse Wavelet Transformation: Synthesis/Reconstruction Process)

$x[2n]=s[n]-(d[n]+d[n-1])/4$ $x[2n+1]=d[n]+(x[2n+2]+x[2n])/2$

It is to be noted that a signal expressing the image is input to be used as the x value in the wavelet transformation, that the noise component contained in the wavelet transformation coefficients s and d having been generated is extracted and that the values of the extracted noise component are set as s and d for substitution in the inverse wavelet transformation so as to generate a noise image x, as shown in FIGS. 3A-3B.

While the multiple resolution levels are achieved through the five-stage wavelet transformation in the example described above, the number of stages over which the wavelet transformation is executed may be adjusted in correspondence to the size of the initial input image. In addition, instead of the (bilateral) orthogonal wavelet transformation described above, Laplacian pyramid representation, steerable pyramid representation or the like may be adopted to achieve the multiple resolution levels.

3 Noise Extraction Processing through Virtual Noise Removal
3-1 Noise Extraction Processing with Noise Removal Filter
3-1-1 Noise Removal Processing First, virtual noise removal is executed at each resolution. The term "virtual noise removal" refers to the noise removal executed on a temporary basis prior to the ultimate noise removal executed to remove noise from the original image. While the virtual noise removal may be executed on the individual subbands at each resolution by using any noise removal filter, the following explanation focuses on a bilateral filter assuring very high-performance among widely known edge-preserving smoothing filters and a modified bilateral filter such as that disclosed in International Publication No. 2006/06825 pamphlet (disclosed by the inventor of the present invention), achieved by improving on the first bilateral filter. Since the image signal V(x, y) has shifted into a space that assures uniform noise relative to the brightness through the non-linear gradation conversion executed in step S2 in FIG. 2, the filter simply must be set so as to compare the signal with a constant noise index value unaffected by the brightness level. Under such circumstances, the noise removal filter provides the highest level of performance through simple operation.

Standard Bilateral Filter $$V'(\vec{x}) = \frac{\int_{|\vec{x}'-\vec{x}|\leq 2r_{th}} V(\vec{x}') \exp\left(-\frac{|V(\vec{x}')-V(\vec{x})|^2}{\sigma_{th}^2}\right)\exp\left(\frac{|\vec{x}'-\vec{x}|^2}{r_{th}^2}\right)d\vec{x}'}{\int_{|\vec{x}'-\vec{x}|\leq 2r_{th}} \exp\left(-\frac{|V(\vec{x}')-V(\vec{x})|^2}{\sigma_{th}^2}\right)\exp\left(\frac{|\vec{x}'-\vec{x}|^2}{r_{th}^2}\right)d\vec{x}'}$$ 
[Expression 7]

Modified Bilateral Filter $$V'(\vec{x}) = \frac{\int_{|\vec{x}'-\vec{x}|\leq 2r_{th}} V(\vec{x}') \exp\left(-\frac{|V(\vec{x}')-V(\vec{x})|^2}{\sigma_{th}^2} \cdot \frac{|\vec{x}'-\vec{x}|^2}{r_{th}^2}\right)d\vec{x}'}{\int_{|\vec{x}'-\vec{x}|\leq 2r_{th}} \exp\left(-\frac{|V(\vec{x}')-V(\vec{x})|^2}{\sigma_{th}^2} \cdot \frac{|\vec{x}'-\vec{x}|^2}{r_{th}^2}\right)d\vec{x}'}$$
[Expression 8]

For purposes of simplification, the expressions above do not include the subband identifying symbols i and j. The threshold value $\sigma_{th}$ is set in correspondence to an expected noise fluctuation width (noise fluctuation index value) in each subband and the noise component is extracted by distinguishing noise from edges. $\sigma_{th}$ is set so as to assume a greater value as the ISO sensitivity rises. For instance, $\sigma_{th}$ may be set to a value of approximately 10 in correspondence to 256 gradation levels at ISO 6400. Accordingly, noise fluctuation occurs to an extent of approximately ±10 over the full gradation range, achieving uniform noise and S/N=256/10 even at the lightest saturation level.

It is generally understood that once a specific $\sigma_{th}$ value is determined in correspondence to the original image, the value of $\sigma_{th}$ for each subband plane resulting from multiresolution transformation can be automatically calculated by using the wavelet transformation-defining expression based upon the law of propagation of errors. The optimal noise fluctuation index value can then be determined for each subband in correspondence to the $\sigma_{th}$ value. It may be set in conjunction with, for instance, the 5/3 filter as follows.

$$\delta d = \sqrt{\left(\frac{1}{2}\right)^2 + 1^2 + \left(\frac{1}{2}\right)^2}\,\delta x$$

$$= \sqrt{\frac{3}{2}}\,\delta x$$

$$= 1.225\,\delta x$$

$$\delta s = \sqrt{\left(\frac{1}{8}\right)^2 + \left(\frac{1}{2}\right)^2 + 1^2 + \left(\frac{1}{2}\right)^2 + \left(\frac{1}{8}\right)^2}\,\delta x$$

$$= \sqrt{\frac{23}{32}}\,\delta x$$

$$= 0.848\,\delta x$$

[Expression 9]

However, the two-dimensional filter used in reality is represented by the integrated product of these one-dimensional filters.

The threshold value rth should assume a value in a range of, for instance, 0.5~3.0 pixels so as to ensure that the ranges of the noise removal filters at different resolution levels overlap. In addition, the integrating range should be set so that the range is equivalent to double or triple the rth value in order to ensure that the coefficient assumes a small enough value. A satisfactory level of noise removal effect can be normally achieved with another type of noise removal filter, as long as it executes filtering processing on subband images expressed through multiple resolution levels by referencing pixel signals within a pixel range of 3×3~9×9.

It is to be noted that the bilateral filter is a type of weighted averaging filter that assumes a weighting coefficient adjusted in correspondence to the differential value representing the difference between the target pixel and a nearby pixel. The modified bilateral filter is a non-separation weighting-type bilateral filter, which differs from the standard bilateral filter in that the weighting coefficient cannot be separated into a photometric term and a geometric term. This means that the modified bilateral filter assumes a weighting coefficient represented by a single exponential function with a value represented by the product of two arguments set as an exponent thereof. These two bilateral filters can each be regarded to separate the edge signal and the noise signal contained in the pixel structure from each other based upon a noise model whereby a signal fluctuates over a reference width equivalent to the noise fluctuation index value.

3-1-2 Noise Extraction Processing

Noise extraction processing is executed for each subband as expressed below.

$$n_{ij}(\vec{x})=V_{ij}(\vec{x})-V'_{ij}(\vec{x})$$
[Expression 10]

Figure 4A:
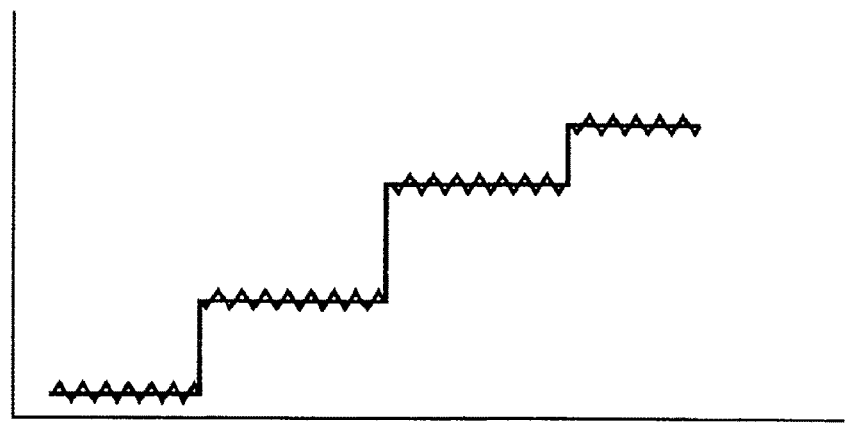
FIGS. 4A-4C show signal-noise relationships.
Figure 4B:
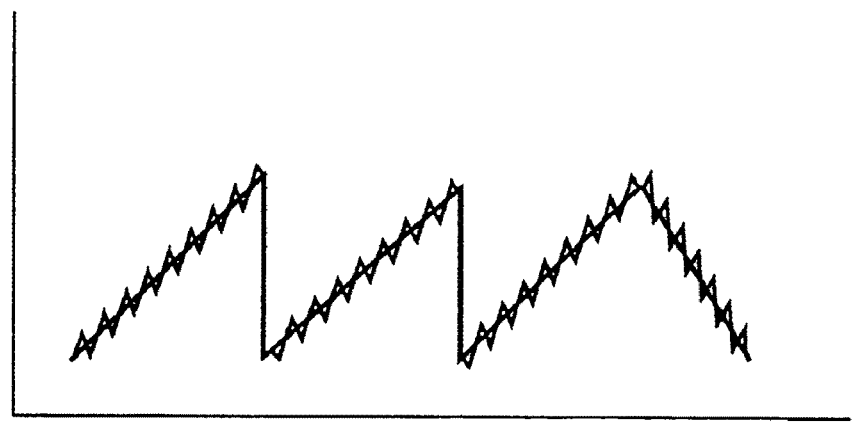
Figure 4C:
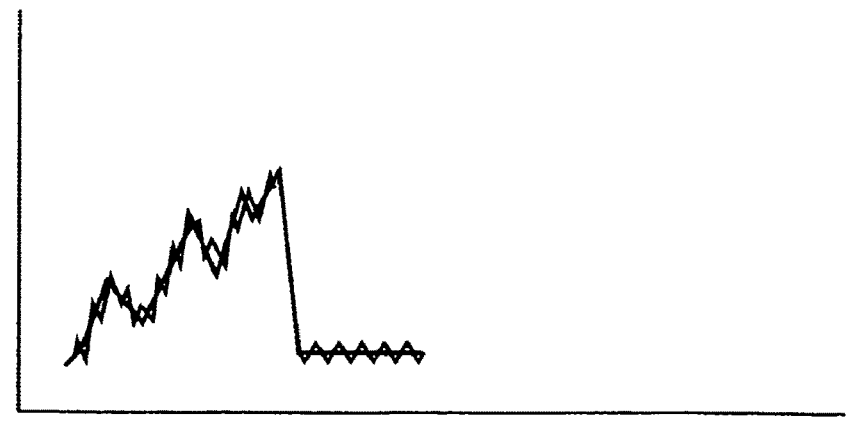

The extracted noise component is highly likely to contain a singular edge component having entered therein during the smoothing process. Namely, while the fluctuation component extracted from V(x, y) representing a flat plane or an inclined plane ranging over an area greater than the integrating range (see FIGS. 4A and 4B) can be assumed to be distributed with a Gaussian distribution pattern, a singular edge component that does not conform to the Gaussian distribution pattern may be contained in the fluctuation component extracted at a position (see FIG. 4C) where the edge fluctuates drastically and thus the assumption cannot be made. FIGS. 4A-4C show signal-noise relationships that may be observed under such circumstances.

First, a model taken over an area where three different types of signals, i.e., a slight noise signal, a steep edge signal, and an intermediate edge signal present in the vicinity and rendering the appearance of depth, which is somewhat stronger than the noise but far weaker than the steep edge, overlap one another (see FIG. 4C), is examined. In such a model, a disturbance caused by the presence of a significant steep edge may increase the relative smoothing weight applied to an intermediate edge pixel that would be successfully exempted from smoothing in a uniform flat plane or a uniform inclined plane, and the intermediate edge component may become mixed in the noise component. The intermediate edge component may manifest in the noise component as a singular edge of a strong noise signal, or may cause the noise component frequency distribution to deviate from the Gaussian distribution. The "singular edge component" in this context refers to an intermediate edge signal somewhat stronger than faint noise but far weaker than a steep edge.

This phenomenon may manifest in an actual image in which a power pole, power lines, a traffic signal and the like are photographed together against a building with a low-contrast tiled wall in the background. In this image, the pattern in the tiled wall, equivalent to the intermediate edge, may fade or part of the steep edge such as a power line or the power pole, detected as an intermediate edge, may be lost, leading to loss of depth in the image. In other words, a flat image in which the power lines or the power pole appear to be embedded in the building may result from the smoothing process.

3-2 Sequential Noise Extraction

It is difficult to extract the entire noise component seamlessly through noise removal filtering executed on each subband plane. Accordingly, noise is extracted sequentially by referencing the noise having been extracted at another resolution level so as to ensure that there will be no gap between the frequency bands separated by multiresolution decomposition in the embodiment. While it is not essential that noise be extracted sequentially as described above, it is more desirable to execute the sequential noise extraction as explained below for better precision.

While the sequential noise removal may be executed either during the analysis phase or during the synthesis phase, the noise removal filtering operation mentioned earlier is executed in the first embodiment upon facilitating the extraction of the noise component from the LL plane by executing virtual noise synthesis for purposes of complete noise component extraction and subtracting the synthesized noise component generated at each hierarchical layer from the corresponding LL subband plane. In other words, sequential noise removal is executed during the synthesis phase in the embodiment.

An explanation is now given on the processing executed on image signals S2 (LL2, LH2, HL2, HH2) at ¼ resolution level, generated by executing wavelet transformation on an image signal S0 (LL0) on the actual space plane twice. First, the synthesized noise component (N2) having been generated through noise synthesis executed for the ⅛ resolution hierarchical layer, i.e., the hierarchical layer immediately below the ¼ resolution hierarchical layer, is subtracted from the subband LL2, thereby creating LL2' in which the noise component can be extracted with ease from LL2 (processing (2-0)). Subsequently, the noise removal filtering operation explained earlier is executed on each subband (LL2', HL2, LH2, HH2) (processing (2-1)).

Subsequently, a noise component n2 is extracted (processing (2-2)) by subtracting image signals S2" (subbands LL2", HL2', LH2', HH2') having undergone the noise removal filtering operation from the image signals S2' (subbands LL2', HL2, LH2, HH2) in the pre-noise removal filtering operation state. The noise component at the LL plane in the extracted noise component n2 is added to the noise component (N2) generated through noise synthesis at the lower hierarchical layer (processing (2-3)), and then noise synthesis is executed through inverse wavelet transformation by using the added LL plane noise component and the extracted noise component corresponding to the other plane, (the LH, HL and HH planes), thereby generating a synthesized noise component (N1) (processing (2-4)). The processing described above is executed at the individual hierarchical layers to achieve virtual noise synthesis. Namely, the virtual noise synthesis is expressed as follows is executed.

$$N(\vec{x}) = \sum_{\substack{i=LL,LH,HL,HH \\ j=1,2,\ldots,5}} Wavelet^{-1}\{n_{ij}(\vec{x})\} \qquad \text{[Expression 11]}$$

While FIGS. 3A-3B clearly indicate the processing details, the processing in FIGS. 3A-3B is equivalent to repeatedly executing processing whereby arithmetic processing expressed as $$N_M(\vec{x}) = \sum_{\substack{i=LL,LH,HL,HH \\ j=5,4,\ldots,M+1}} Wavelet^{-1}\{n_{ij}(\vec{x})\} \qquad \text{[Expression 12]}$$

$$V'_{LL,j}(\vec{x}) = V_{LL,j}(\vec{x}) - N_j(\vec{x}) \qquad \text{[Expression 13]}$$

is followed by the processing explained in 3-1-1 and 3-1-2. When M=5, the noise component synthesis is executed without any noise actually extracted and thus, N5 (x, y)=0.

4 Statistical Verification of the Noise Signal (Noise Refining by Using the Noise Itself)

While the noise component is extracted with the noise extraction smoothing filter by checking the signal fluctuation width based upon the differential value representing the difference between pixels taken along the (x, y) spatial direction, it is not at all certain exactly what noise component is extracted as a result. Depending upon the image structure condition, a singular component may be present in the extracted noise component, as explained earlier. In addition, such a singular component may manifest in any way, depending upon the performance level of the noise removal filter.

Accordingly, bearing in mind that the noise component to be extracted or smoothed through the noise removal filter is random noise, it can be reasonably assumed that an error of a certain type has occurred at the noise removal filter unless the behavior of the extracted noise component demonstrates Gaussian distribution characteristics attributable to the Poisson's distribution along the gradation z direction.

Namely, the noise extraction results are statistically examined by using the following expression to determine whether or not they indicate behavior likely to be that of noise, so as to exclude any singular edge component contained in the extracted noise by error and to approximate the state of the initial random noise (processing (1-6), (2-6), (3-6), (4-6), (5-6)). In other words, the noise model common to the hypothetical noise model assumed in the noise removal filter used in the noise extraction is re-examined in correspondence to the extraction results and a decision is made as to whether or not the extraction results are reasonable. If the extraction results are determined to be unreasonable, the extraction results are then corrected so as to better approximate the model. Through this analysis executed simply by comparing the noise fluctuation model width and the value, the desired effect can be achieved to a significant degree fairly quickly and with ease. Since the purity of the noise component is increased through the processing, it may also be referred to as noise refining.

$$n'_{ij}(\vec{x}) = n_{ij}(\vec{x}) \cdot \exp\left(-\frac{n_{ij}(\vec{x})^2}{\sigma_{nthij}^2}\right)$$ [Expression 14]

The expression above indicates that the target data are attenuated to a greater extent when they indicate a greater noise value (gradation). The exp term represents a Gaussian distribution probability with the ratio of the extracted noise component and the noise fluctuation index value assumed as an argument, and the mixing ratio, with which a component not likely to be the noise component is mixed in the extracted noise component, is statistically estimated based upon the Gaussian distribution probability. Namely, when the noise component indicates a greater value, the mixing ratio of the component (a false noise component) not likely to be the actual noise component is estimated to be higher and the false noise component is eliminated by attenuating the noise component.

Under normal circumstances $\sigma_{nthij}$ should assume a value 3~5 times the noise fluctuation index value $\sigma_{thij}$ used in conjunction with the noise removal filter. $\sigma_{thij}$ used in the noise removal filter normally assumes a width $1\sigma$ relative to the noise fluctuation width that can be taken in conjunction with the normal distribution and noise may fluctuate as it deviates with the error function remainder probability beyond the $\pm 1\sigma$ range. In other words, it may deviate from the $\pm 1\sigma$ range with a probability of 100−68.3=31.7%. However, it is statistically not possible for any noise to fluctuate beyond the $\pm 3\sigma$ range or the $\pm 5\sigma$ range. Accordingly, any such noise signal having been detected can be assumed with 100% certainty to be an actual edge component having become mixed into the extracted noise component. Namely, it can be assumed to be a false noise component.

It is to be noted that in actual application, $\sigma_{nthij}$ should be set to $6\sigma_{thij}$ to assure a wider safety margin. In this situation, the error function remainder probability will be ~$3\times10^{-7}$, reducing the probability of error whereby the actual noise component having been extracted is erroneously judged to be a non-noise component to one pixel out of 3,000,000 pixels and simply assuring a significant improvement without inducing any problems in a practical application.

The exp term representing the Gaussian distribution probability assumes a smaller value when the noise component indicates a greater value in comparison to a specific multiple of the noise fluctuation index value. Accordingly, the noise component indicating a greater value can be attenuated to a greater extent for purposes of elimination by multiplying the noise component by the Gaussian distribution probability. Namely, the noise component is attenuated by multiplying the extracted noise component by the Gaussian distribution probability so as to exclude a component that is not likely to be the actual noise component, i.e., the singular edge component.

The exp term may also be referred to as a verifying means for noise probability verification, and the exp term, i.e., the Gaussian distribution probability, can be further regarded as an index representing the reliability with which a component can be judged to be actual noise. In the embodiment, the noise, having been extracted with a spatial filter that uses a noise model assuming the Gaussian distribution probability as an edge-noise discriminant function, is then examined in reference to the exp term adopting the common noise model taking on a width interlocking with that of the spatial filter engaged in operation as expressed earlier, so as to attenuate any signal that is not likely to be the actual noise (false noise) and to extract the true noise component (actual noise component). It is to be noted that determining through estimation the true noise component $n'_{ij}$ contained in the noise component $n_{ij}$ having been extracted with the spatial filter is equivalent to estimating the level of the edge component, i.e., the component other than the true noise component. Namely, (1−exp term) indicates the probability of an edge component, i.e., the singular edge component, being mixed into the extracted noise component and the edge component (singular edge component) different from the true noise component can be estimated based upon (1−exp term).

Figure 5A:
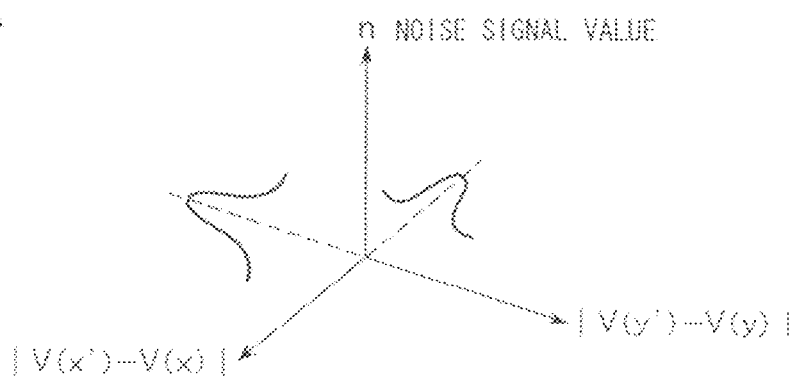
FIGS. 5A-5D present illustrations provided to facilitate an explanation of how noise is refined in the first embodiment.
Figure 5B:
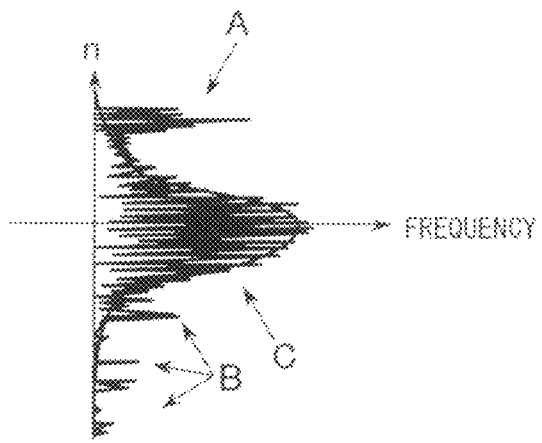

FIGS. 5A-5D present illustrations of the noise refining executed in the embodiment. FIG. 5A presents an illustration of the noise extraction processing executed by using an edge-preserving smoothing filter. The noise extraction processing is executed by checking signal differences in a bidirectional space ranging along the x direction and the y direction. FIG. 5B shows the distribution of the values of noise signals extracted with the edge-preserving smoothing filter in FIG. 5A.

The component extracted from an edge structure area where an edge and noise cannot be accurately separated from each other with ease, which is mostly an edge component, i.e., the singular edge component explained earlier, is plotted over areas A and B in the distribution diagram. The component extracted from an edge structure area where an edge and noise can be separated effectively from a flat image area, which is mainly a noise component, is plotted over area C.

Figure 5C:
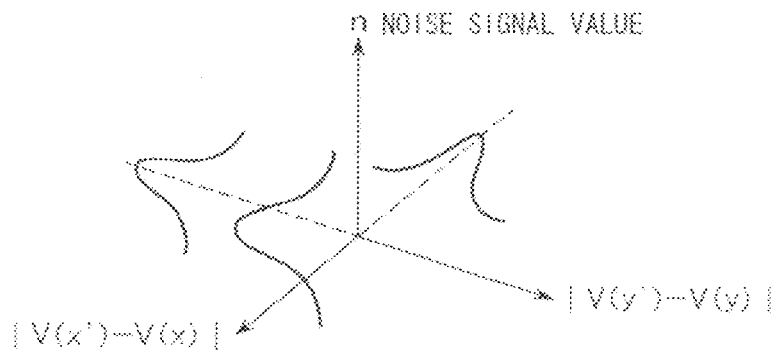
Figure 5D:
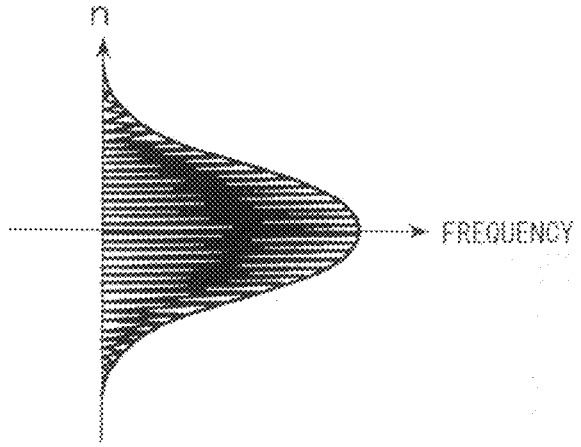

FIG. 5C provides an illustration of how the noise extraction processing is executed by using the edge-preserving smoothing filter and then the noise refining explained earlier is executed. The noise extraction processing is executed by examining the signal differences in the bidirectional space ranging along the x direction and the y direction and then the probability of individual signals being the actual noise is examined along the z (gradation) direction based upon the identical noise model. FIG. 5D shows the distribution of the values of the noise signals having been extracted with the edge-preserving smoothing filter and then having undergone the noise refining process as shown in FIG. 5C. The appearance of the distribution in FIG. 5D is that of a normal noise distribution. In the embodiment, the noise is examined by using a common noise model along a total of three directions; the two directions in which the image space ranges, i.e., along the x direction and the y direction, and the gradation z direction.

It is to be noted that unlike the $\sigma$ filter or the $\varepsilon$ filter, a bilateral filter extracts the noise component by taking into consideration additional factors such as the spatial relative distance and the spatial propagation distance in the image structure through the use of the geometric term or the geometric argument. Accordingly, the standard edge-preserving smoothing filter can be regarded to execute, at least, three-dimensional examination based upon the common noise model, whereas the bilateral filter can be regarded to achieve five-dimensional examination through the use of the additional Gaussian distribution model.

As described above, the accuracy with which the actual noise is separated from the edge component can be autonomously improved simply by checking the condition of the extracted noise component. In addition, since this nonlinear conversion processing is extremely simple processing that needs to be executed only once per pixel, better noise extraction performance is achieved through simple processing.

The noise refining processing executed by using the noise itself provides a universal solution to the problem inherent to the edge-preserving smoothing filter whereby the edge component in a complicated image structure area is erroneously smoothed to result in a flattened image. Consequently, noise can be removed from the luminance component by retaining the depth and the sharpness of the original image and noise can be removed from the chrominance component while assuring a high level of color fidelity. Thus, very accurate noise removal is enabled overall to provide an image with no loss of quality.

In addition, while the processing executed in the embodiment is equally effective at a low ISO sensitivity level in providing a sharp and richly colored image, it is particularly effective when adopted at a high sensitivity level, since the noise removal accuracy of the edge-preserving smoothing filter is bound to be compromised over an edge area as the value of $\sigma_{th}$ at the smoothing filter is raised at the high sensitivity level, which raises the probability of erroneous smoothing. In other words, the processing executed in the embodiment is extremely effective in providing an image with a three-dimensional attribute over a sensitivity range in which accurate noise removal is crucial.

It is to be noted that the noise fluctuation index value $\sigma_{th}$ at the actual spatial plane is uniquely determined by photographing a standard grayscale step chart and ascertaining a standard deviation in correspondence to each brightness level so that the noise fluctuation index value $\sigma_{th_{ij}}$ to be used in the smoothing filter is determined. The noise fluctuation index value assumes a single value regardless of the brightness level in a space achieving uniform noise and the noise fluctuation index value $\sigma_{th_{ij}}$ used in the smoothing filter in correspondence to each subband plane can be determined uniquely through an operation defined in a multiresolution transformation expression based upon evaluation criteria conforming to the law of propagation of errors.

5 Actual Noise Synthesis

After the entire noise component in each subband has been extracted, the noise component signals having been refined to achieve a high level of purity are synthesized by applying optimal weights, each corresponding to a specific frequency band, so as to assure the highest possible noise removal effect while minimizing damage to the actual image (processing (1-7) (2-7) (3-7) (4-7) (5-7)). When the noise is hypothetically assumed to be white noise, weights are applied invariably at the ratio of 1:1 between the individual resolution hierarchical layers and mainly the high-frequency subbands HH, HL and LH are weighted relative to the low-frequency subband LL.

The optimal weights to be applied in this process vary depending upon the nature of the original image. In conjunction with the luminance plane, which contains a great deal of high-frequency information, great weight should be applied to the high-frequency subbands, whereas a somewhat significant weight should be applied to the low-frequency subband in conjunction with a chrominance plane containing a great deal of low-frequency information. Namely, the weight application is equivalent to adjusting the frequency projection space used in the noise extraction processing to a frequency space where accurate noise removal and desirable image structure preservation can both be assured, in correspondence to the nature of the original image. It is to be noted that Nw5 (x, y)=0 for Nw5 (see FIG. 3B) at the 1/32 resolution level, since the noise component signals are synthesized with noise not extracted.

$$N_w(\vec{x}) = \sum_{\substack{i=LL,LH,HL,HH \\ j=1,2,\ldots,5}} Wavelet^{-1}\{k_{nij} \cdot n'_{ij}(\vec{x})\} \quad \text{[Expression 15]}$$

6 Actual Noise Removal Processing

The noise is removed (processing (0-8)) by actually subtracting the synthesized noise component Nw0 from the initial image S0 (LL0). The processing is executed with a noise removal rate λ (processing (0-9)) so as to afford a higher degree of freedom in consideration of the ultimate appearance of the image resulting from the noise removal.

$$\overline{S}(\vec{x}) = S(\vec{x}) - \lambda \cdot N_w(\vec{x}) \quad \text{[Expression 16]}$$

λ=const.

It is desirable to select a value substantially equal to 1.0 for λ during the chrominance plane processing, whereas it is desirable to leave noise at a specific rate in correspondence to the specific preference regarding sharpness during the luminance plane processing.

The noise removal processing executed in step S3 in FIG. 2 is completed through the procedure described above. It is to be noted that the noise removal processing in step S3 is executed individually for the luminance component $\hat{L}$ and the chrominance components $\hat{a}$ and $\hat{b}$.

7 Reverse Color Space Conversion

Next, in step S4 in FIG. 2, the noise-free image in the image processing space is converted to an image in the output color space. Provided that the output color space is identical to the input color space, the noise-free image can be converted through reverse conversion executed by reversing the procedural order of "1 color space conversion". Since the image processing space is a device-independent space, the noise-free image can be converted to any standard color space. If the input color space and the output color are not identical, the conversion should be executed in compliance with the specifications of the output color space.

8 Image Output

In step S5, the image data, having been rendered noise-free as described above, are output Second Embodiment In reference to the second embodiment, a method for improving the edge/noise separation performance based upon multiresolution image representation, achieved from a perspective different from that of the first embodiment, is described. Since the processing in the second embodiment can be executed completely independently of the noise-refining processing executed for each subband plane in the first embodiment, it can be executed in conjunction with the noise-refining processing in the first embodiment to enhance the edge/noise separation performance level twofold. Accordingly, the embodiment is described below on the assumption that the processing is executed in addition to the processing in the first embodiment.

Since the image processing apparatus achieved in the second embodiment assumes a structure identical to that shown in FIG. 1 in reference to which the first embodiment has been described, a repeated explanation is not provided. In addition, since "1 Color space conversion", "2 Multiresolution image representation", "3 Noise extraction processing through virtual noise removal", "4 Statistical verification of the noise signal" and "5 Actual noise synthesis" executed in the second embodiment are identical to those executed in the first embodiment having been described earlier, a repeated explanation is not provided.

Figure 6A:
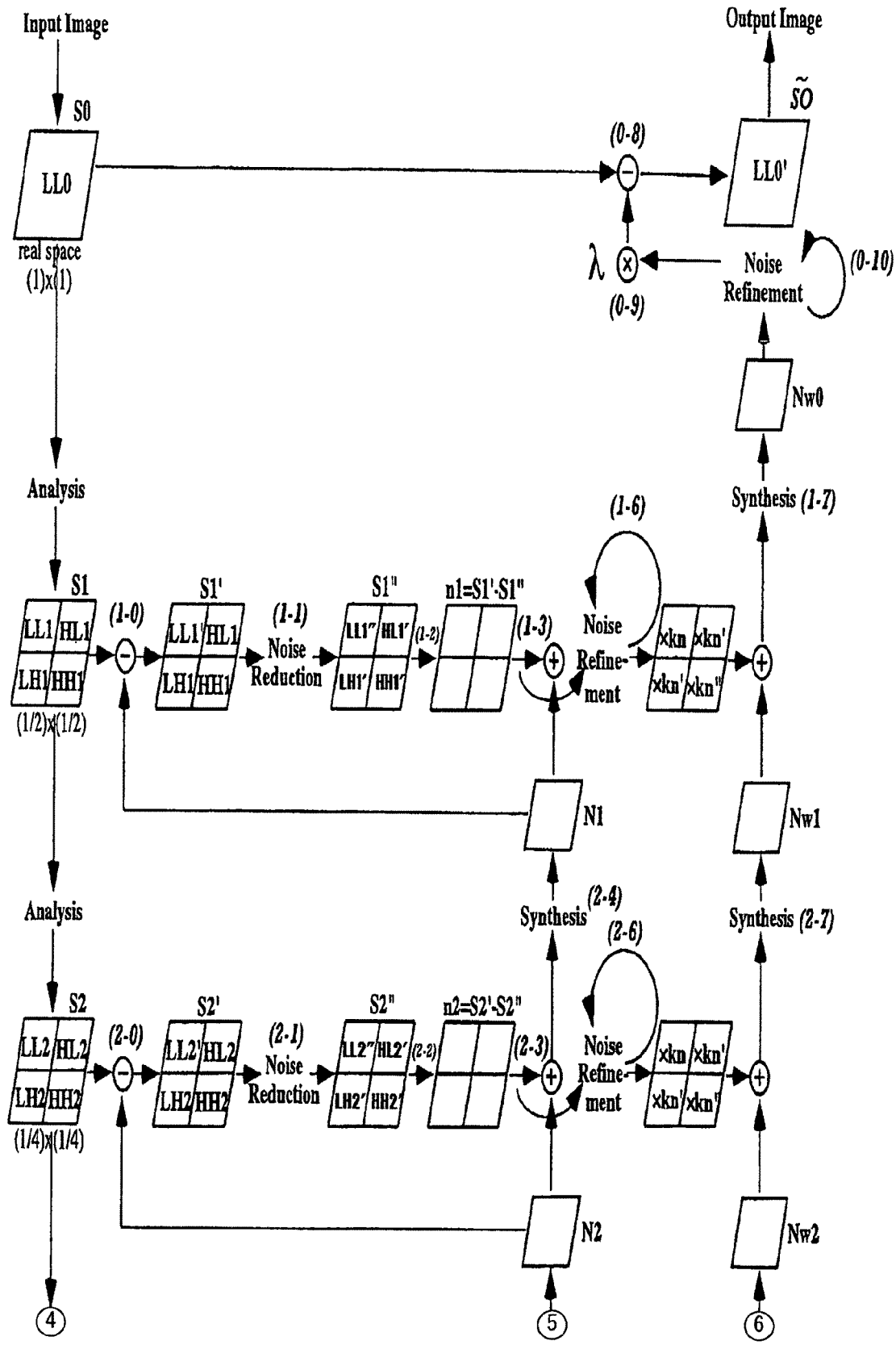
FIGS. 6A-6B present a flowchart of the noise removal processing executed based upon multiresolution image representations in a second embodiment FIG. 7 provides a flowchart of the noise removal processing executed in a sixth embodiment.
Figure 6B:
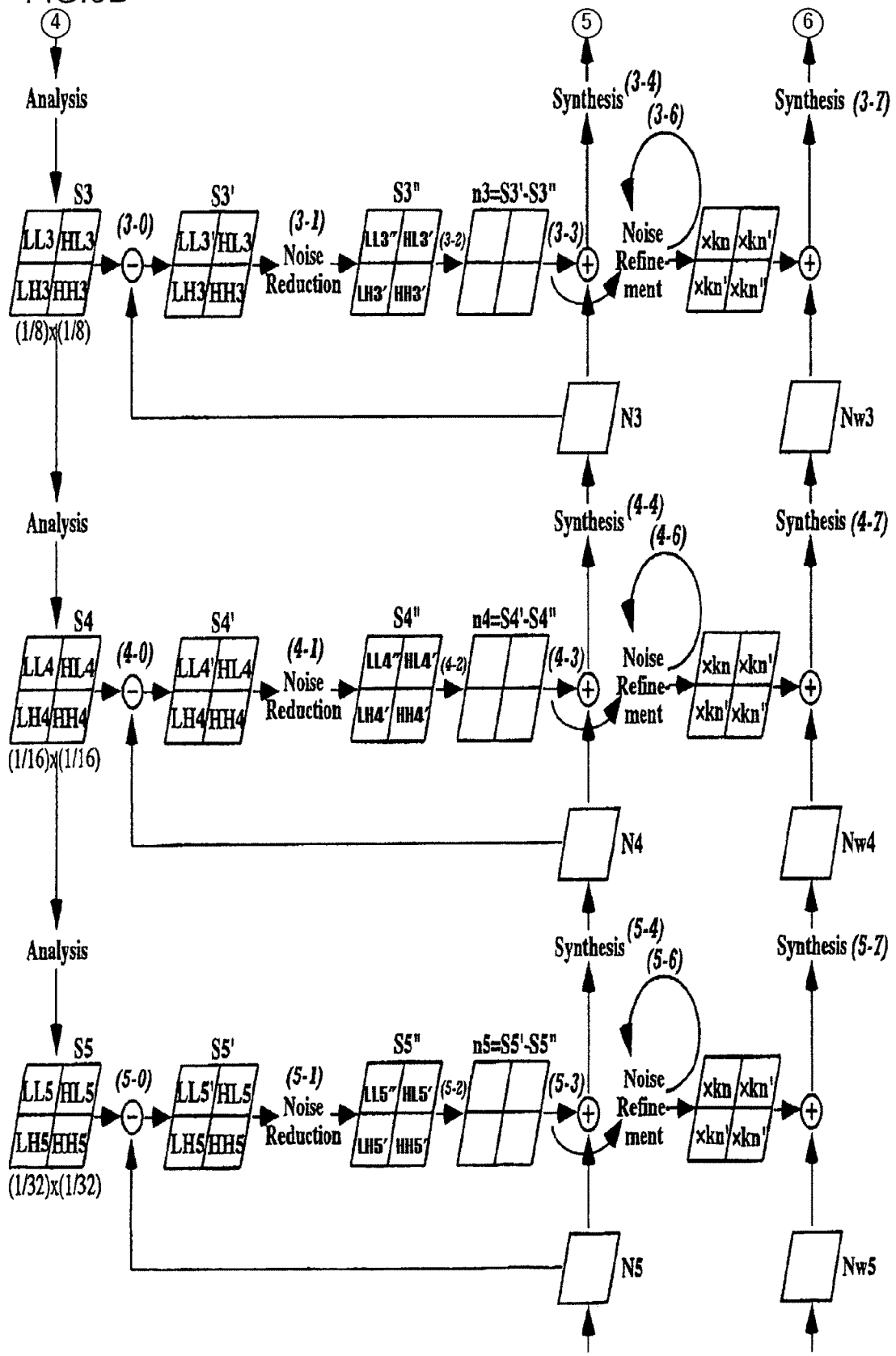

FIGS. 6A-6B present a flowchart of the noise removal processing executed based upon multiresolution image representation in the embodiment. The flowchart in FIGS. 6A-6B corresponds to that presented in FIGS. 3A-3B in reference to which the first embodiment has been described. The same processing step numbers (*-*) are assigned to steps in which processing identical to that in FIGS. 3A-3B is executed.

6 Statistical Re-Verification of the Synthesized Noise Signal (Noise Re-Refining by Using the Noise Itself)

Based upon the same principle as that of the statistical verification of the noise component at each subband plane, executed in step S3 in FIG. 2 in the first embodiment, the synthesized noise component is statistically re-examined to determine whether or not it demonstrates noise-like behavior (processing (0-10)) as expressed below, so as to improve the purity of the noise component by eliminating any edge component that may still be present in the synthesized noise component by error.

$$N'_w(\vec{x}) = N_w(\vec{x}) \cdot \exp\left(-\frac{N_w(\vec{x})^2}{\sigma_{nth}^2}\right) \quad \text{[Expression 17]}$$

There is an added significance to re-examining the synthesized noise signal for any erroneous noise extraction through the noise removal filter at each subband plane at the final stage of the noise removal processing executed through multiresolution transformation. Mainly, as has been described in "3-2 Sequential noise extraction", it must be borne in mind that noise component signals are extracted not only from the high-pass side high-frequency subbands constituting a complete system but also from the low-frequency subbands overlapping with slight redundancy and that all these noise component signals are synthesized in order to ensure that all the noise is extracted seamlessly in spite of the gaps between the frequency bands assumed in conjunction with the noise removal filters.

Namely, over a frequency range where a high-frequency subband and a low-frequency subband overlap, a given noise component signal may be extracted twice. This means that an edge component signal may be extracted twice as part of such a noise component signal and that the extracted noise component must assume characteristics closely approximating the Gaussian distribution characteristics of pure noise in the overall system by eliminating the noise component and the edge component erroneously extracted a second time. The noise-refining processing executed in this stage has been proven through testing to be very effective, i.e., as effective as the overall effect of the noise refining executed at the individual subbands in the first embodiment or even more effective than the effectiveness of the noise refining executed in the first embodiment.

It is to be noted that a value achieving a relationship to the noise fluctuation index value $\sigma_{th}$ for the original image in the actual space having been described in "3-1-1 Noise removal processing", which is identical to the relationship between the threshold value $\sigma_{nthij}$ assumed in conjunction with each subband plane and the noise fluctuation index value $\sigma_{thij}$ corresponding to the subband plane, having been described in "4 Statistical verification of the noise signal", should be set as the threshold value $\sigma_{nth}$. Accordingly, it is desirable to set $\sigma_{nth}$ to $6\sigma_{th}$ to assure the greatest margin of safety. In other words, the noise-refining processing is executed in the embodiment by using the same noise model as that used in the noise removal filter.

7 Actual Noise Removal Processing

Processing identical to "6 Actual noise removal processing" in the first embodiment is executed.

It is to be noted that the intended purpose of "6 Statistical re-verification of the synthesized noise signal" in the embodiment can be fulfilled by handling the noise removal rate λ as a function in "7 Actual noise removal processing" without having to execute the statistical re-verification as separate processing. Namely, the intended purpose of the re-verification can be fulfilled by modifying expression 15 used in the first embodiment as follows.

$$\vec{S}(\vec{x}) = S(\vec{x}) - \lambda(\vec{x}) \cdot N_w(\vec{x}) \quad \text{[Expression 18]}$$

$$\lambda(\vec{x}) = \lambda_0 \exp\left(-\frac{N_w(\vec{x})^2}{\sigma_{nth}^2}\right)$$

$$\lambda_o = const.$$

8 Reverse Color Space Conversion

Processing identical to "7 Reverse color space conversion" in the first embodiment is executed.

It is to be noted that the refining processing executed at the individual resolution levels (processing (1-6), (2-6), (3-6), (4-6), (5-6)) may be skipped and the final refining processing (processing (0-10)) alone may be executed in the second embodiment.

Third Embodiment

While a higher image quality is given priority in the first and second embodiments, the maximum level of processing simplification is pursued in the third embodiment. However, it will be obvious that noise refining processing similar to that executed in the first or second embodiment may be executed in conjunction with the third embodiment. The third embodiment differs from the previous embodiments in that a simpler and faster σ filter is used as the edge-preserving smoothing filter with the noise refining processing simplified to match the level of noise removing performance of the σ filter. Namely, as the noise model, used in conjunction with the discriminant function for separating the edge component and the noise component from each other through the noise removal filter, is switched from the Gaussian model to a threshold value model, the discriminant function for separating the edge component from the noise component for purposes of noise refining, too, assumes an identical threshold-value model.

Since the image processing apparatus achieved in the third embodiment assumes a structure identical to that shown in FIG. 1 in reference to which the first embodiment has been described, a repeated explanation is not provided. In addition, since the flow of the image processing executed by the personal computer 1 in the third embodiment is similar to that in the flowchart presented in FIG. 2, a repeated explanation is not provided. The following explanation focuses on the differences from the processing executed in the first embodiment.

1 Color Space Conversion

Processing similar to that in the first embodiment is executed.

2 Multiresolution Image Representation

Processing similar to that in the first embodiment is executed.

3 Noise Extraction Processing through Virtual Noise Removal 3-1 Noise Extraction Processing with Noise Removal Filter 3-1-1 Noise Removal Processing A simple and fast σ filter expressed below is used instead of the high-performance bilateral filter used in the first embodiment.

$$V'(\vec{x}) = \frac{\int_{|\vec{x}'-\vec{x}|\leq D} V(\vec{x}')\delta(V(\vec{x}'), V(\vec{x}))d\vec{x}'}{\int_{|\vec{x}'-\vec{x}|\leq D} \delta(V(\vec{x}'), V(\vec{x}))d\vec{x}'}$$ [Expression 19]

$$\delta(V(\vec{x}'), V(\vec{x})) = \begin{cases} 1, & \text{if } |V(\vec{x}) - V(\vec{x})| \leq \sigma_{th} \\ 0, & \text{otherwise} \end{cases}$$

An integrating range D similar to that set in the first embodiment should be selected.

3-2 Sequential Noise Extraction

Processing similar to that in the first embodiment is executed.

4 Statistical Verification of the Noise Signal

Since the decision-making in the spatial filtering processing is executed based upon a threshold value in the virtual noise removal processing phase described above, a decision is made in reference to a threshold value as described below in the subsequent statistical verification, i.e., in the noise refining processing in the embodiment. A value interlocking with the threshold value set for the σ filter should be selected as the threshold value. Based upon the principle described in reference to the first embodiment, a value approximately 3 times the threshold value $\sigma_{th ij}$ at the σ filter should be set for $\sigma_{nth ij}$.

$$n'_{ij}(\vec{x}) = n_{ij}(\vec{x}) \cdot \delta(n_{ij}(\vec{x}))$$ [Expression 20]

$$\delta(n_{ij}(\vec{x})) = \begin{cases} 1, & \text{if } |n_{ij}(\vec{x})| \leq \sigma_{nth ij} \\ 0, & \text{otherwise} \end{cases}$$

Processing similar to that in the first embodiment is executed in "5 Actual noise synthesis", "6 Actual noise removal processing", "7 Reverse color space conversion" and "8 Image output".

As described above, the processing executed in the third embodiment achieved entirely through threshold-value processing without executing any nonlinear conversion, is greatly simplified. Namely, the distribution function used in the specific noise model is a threshold value distribution model with noise distributed in a pattern represented by a stepped function with the fluctuation index value defining a cutoff point. The processing in the third embodiment achieved through hardware does not require any nonlinear conversion lookup table. In other words, the third embodiment exemplifies an approach toward processing simplification achieved through adjustment of the estimation accuracy in noise refining along the z direction in correspondence to the noise extraction estimation accuracy (the characteristics of the noise removal filter) of the noise removal filter along the (x, y) directions.

In addition, while the absence of any nonlinearity along the (x, y) spatial directions, in the σ filter itself may readily induce compressed gradation in the smooth image, the verification processing, albeit simplified verification processing, executed along the gradation z direction effectively improves the gradation fidelity.

It is to be noted that while examples of sequential synthesis processing, whereby the noise component is extracted in sequence as described in "2 Multiresolution image representation" and "3 Noise extraction processing through virtual noise removal" is executed by first converting the image to images at multiple resolution levels, sequentially smoothing the images with the noise removal filters and synthesizing the extracted noise component signals and then executing synthesized noise subtraction processing before smoothing the upper hierarchical layer image, have been explained in reference to the first through third embodiment, the noise component may instead be extracted through sequential analysis processing achieved by reversing the procedural order of the sequential synthesis processing.

Namely, the noise component may be extracted by first executing multiresolution transformation at the first stage and then smoothing the image plane with the corresponding noise removal filter. In this reversed sequential processing, the extracted noise component will be subtracted from the LL image plane before proceeding to the multiresolution transformation at the next stage. It is to be noted that a flowchart of the reversed sequential processing, which can be easily obtained by modifying the flowchart presented in FIGS. 3A-3B, is not provided.

Fourth Embodiment

The previous embodiments each provide a solution to the challenging issue of the presence of an edge component signal in the extracted noise, not addressed effectively even in highly advanced edge-preserving smoothing filters in the related art. The measures taken in the embodiments as solutions may also be adopted to achieve significant advantages in a noise removal filter in which simplicity and speed are given top priority over the edge/noise separation accuracy.

For instance, Japanese Laid Open Patent Publication No. 2002-74356 discloses a method for obtaining a noise-free smoothed image by extracting an edge component with a fixed edge detection filter, extracting the noise component contained in the edge component through nonlinear conversion and subtracting the extracted noise component from the original signal. An advanced system developed by the inventor of the present invention by building upon this method, is disclosed in International Publication No. 2006/106919 pamphlet. The fourth embodiment is described below in reference to the advanced system.

The explanation of the fourth embodiment focuses on the change made in the noise refining processing executed therein, differentiating the noise refining processing from the corresponding processing executed in the first embodiment or the second embodiment. The sole feature differentiating the fourth embodiment is the noise removal filter used in conjunction with each subband plane. Since all the other aspects of the fourth embodiment are similar to those in the first embodiment or the second embodiment, a repeated explanation is not provided. Namely, a Gaussian model discriminant function is used in the noise removal filter in order to separate the edge component from the noise component, and the noise refining is executed by also using a Gaussian distribution noise model sharing the same fluctuation width in the fourth embodiment.

The fourth embodiment enables a noise removal filter regarded to be inferior to the noise removal filters described in the first embodiment and the second embodiment in that it allows the edge component to infiltrate the noise component at a higher mixing ratio, to greatly improve on its noise removing performance through simple noise refining processing. While the final image quality that may be achieved in conjunction with the noise removal filter in the fourth embodiment may not be as high as those achieved in the first and second embodiments, the extent to which the noise removing performance is improved is considered to be greater than that of either the first embodiment or the second embodiment.

3-1-1 Noise Removal Processing

The virtual noise removal processing is executed on the luminance plane in the fourth embodiment as expressed below.

$$V'(\vec{x}) = V(\vec{x}) - \nabla^2 V(\vec{x}) \cdot \exp\left(-\frac{|\nabla^2 V(\vec{x})|^2}{\sigma_{th}^2}\right) \quad \text{[Expression 21]}$$

$$V''(\vec{x}) = V'(\vec{x}) + \nabla^2 V'(\vec{x}) \cdot \exp\left(-\frac{|\nabla^2 V'(\vec{x})|^2}{\sigma_{th}^2}\right)$$

$$V'''(\vec{x}) = V''(\vec{x}) - \nabla^2 V''(\vec{x}) \cdot \exp\left(-\frac{|\nabla^2 V''(\vec{x})|^2}{\sigma_{th}^2}\right)$$

$$V^{(4)}(\vec{x}) = V'''(\vec{x}) + \nabla^2 V'''(\vec{x}) \cdot \exp\left(-\frac{|\nabla^2 V'''(\vec{x})|^2}{\sigma_{th}^2}\right)$$

The virtual noise removal processing executed on the chrominance planes as expressed below.

$$V'(\vec{x}) = V(\vec{x}) - \nabla^2 V(\vec{x}) \cdot \exp\left(-\frac{|\nabla^2 V(\vec{x})|^2}{\sigma_{th}^2}\right) \quad \text{[Expression 22]}$$

$$V''(\vec{x}) = V'(\vec{x}) - \nabla^2 V'(\vec{x}) \cdot \exp\left(-\frac{|\nabla^2 V'(\vec{x})|^2}{\sigma_{th}^2}\right)$$

The noise fluctuation index value $\sigma_{th}$ defined in the first embodiment or the second embodiment should be used as the fluctuation index value $\sigma_{th}$ in the fourth embodiment. Accordingly, the fluctuation index value used for the noise refining, too, interlocks with the value thus defined, as in the first embodiment.

It is to be noted that the luminance plane noise removal processing and the chrominance plane noise removal processing may each be executed simply as expressed in the uppermost-stage expression. It is to be noted that the noise refining processing is executed exactly as in the first embodiment or in the second embodiment.

Fifth Embodiment

In the fifth embodiment, the concept having been described in reference to the fourth embodiment is adopted in conjunction with the third embodiment. As in the description given in reference to the fourth embodiment, the explanation of the fifth embodiment focuses on the change made in the noise refining processing executed therein, differentiating the noise refining processing from that executed in the third embodiment. The sole feature differentiating the fifth embodiment is the noise removal filter used in conjunction with each sub-band plane. Since all the other aspects of the fifth embodiment are similar to those in the third embodiment, a repeated explanation is not provided.

3-1-1 Noise Removal Processing

The virtual noise removal processing executed on the luminance plane in the fifth embodiment is expressed as follows.

$$V'(\vec{x}) = V(\vec{x}) - \nabla^2 V(\vec{x}) \cdot \delta_{mn} \ldots \begin{cases} m = n \text{ if } |\nabla^2 V(\vec{x})| \leq \sigma_{th} \\ m \neq n \text{ if } |\nabla^2 V(\vec{x})| > \sigma_{th} \end{cases} \quad \text{[Expression 23]}$$

$$V''(\vec{x}) = V'(\vec{x}) + \nabla^2 V'(\vec{x}) \cdot \delta_{mn} \ldots \begin{cases} m = n \text{ if } |\nabla^2 V'(\vec{x})| \leq \sigma_{th} \\ m \neq n \text{ if } |\nabla^2 V'(\vec{x})| > \sigma_{th} \end{cases}$$

$$V'''(\vec{x}) = V''(\vec{x}) + \nabla^2 V''(\vec{x}) \cdot \delta_{mn} \ldots \begin{cases} m = n \text{ if } |\nabla^2 V''(\vec{x})| \leq \sigma_{th} \\ m \neq n \text{ if } |\nabla^2 V''(\vec{x})| > \sigma_{th} \end{cases}$$

$$V^{(4)}(\vec{x}) = V'''(\vec{x}) + \nabla^2 V'''(\vec{x}) \cdot \delta_{mn} \ldots \begin{cases} m = n \text{ if } |\nabla^2 V'''(\vec{x})| \leq \sigma_{th} \\ m \neq n \text{ if } |\nabla^2 V'''(\vec{x})| > \sigma_{th} \end{cases}$$

The virtual noise removal processing is executed on the chrominance planes as expressed below.

$$V'(\vec{x}) = V(\vec{x}) - \nabla^2 V(\vec{x}) \cdot \delta_{mn} \ldots \begin{cases} m = n \text{ if } |\nabla^2 V(\vec{x})| \leq \sigma_{th} \\ m \neq n \text{ if } |\nabla^2 V(\vec{x})| > \sigma_{th} \end{cases} \quad \text{[Expression 24]}$$

$$V''(\vec{x}) = V'(\vec{x}) + \nabla^2 V'(\vec{x}) \cdot \delta_{mn} \ldots \begin{cases} m = n \text{ if } |\nabla^2 V'(\vec{x})| \leq \sigma_{th} \\ m \neq n \text{ if } |\nabla^2 V'(\vec{x})| > \sigma_{th} \end{cases}$$

It is to be noted that the luminance plane noise removal processing and the chrominance plane noise removal processing may each be executed simply as expressed in the uppermost-stage expression. It is to be noted that the noise refining processing is executed exactly as in the third embodiment. It is also to be noted that while the noise refining processing executed in the fifth embodiment may be identical to that executed in the first embodiment or the second embodiment, the same noise fluctuation index value as that defined in conjunction with the noise removal filter should be used in the noise removal processing in the fifth embodiment.

Sixth Embodiment

Today, noise removal processing is often executed by applying a very large noise removal filter directly on the actual spatial plane, instead of removing noise by adopting a multiresolution technology as has been described in reference to the first through fifth embodiments. The following is a description of an example of a large filter application.

Figure 7:
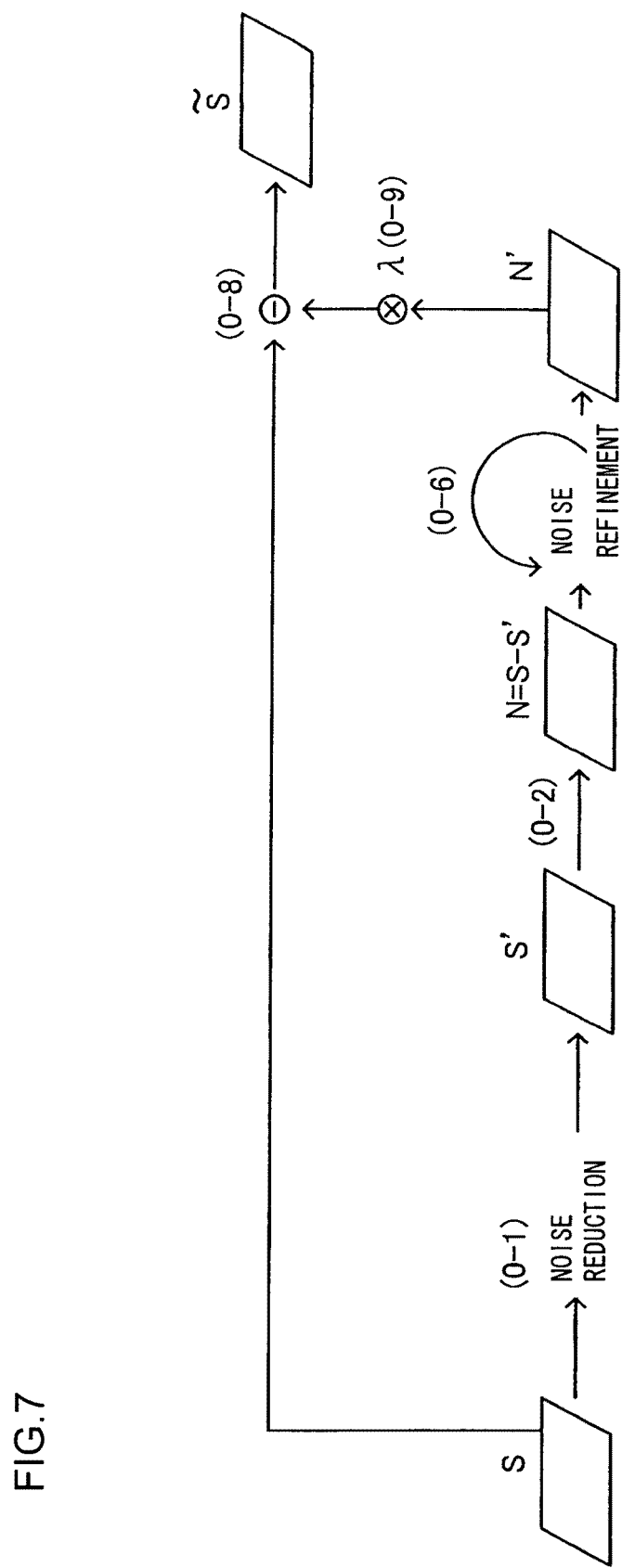

Since the image processing apparatus achieved in the sixth embodiment assumes a structure identical to that shown in FIG. 1 in reference to which the first embodiment has been described, a repeated explanation is not provided. In addition, since the flow of the image processing executed by the personal computer 1 in the sixth embodiment is similar to that in the flowchart presented in FIG. 2, a repeated explanation is not provided. The following explanation focuses on the differences from the processing executed in the first embodiment. FIG. 7 presents a flowchart of the noise removal processing executed in the sixth embodiment.

1 Color Space Conversion

Processing similar to that in the first embodiment is executed.

2 Noise Extraction Processing through Virtual Noise Removal

Since the actual spatial plane is represented by S(x, y), processing identical to that executed on the subband plane V(x, y) in the first embodiment should be executed simply by substituting S for V. However, a greater integrating range must be assumed.

2-1 Noise Removal Processing

While the noise removal processing may be executed through any processing method in order to create the smoothed plane S' by using a σ filter, a ε filter or the like as the noise removal filter, the noise removal processing in the embodiment is executed by using the modified bilateral filter with the most advanced performance, as in the first embodiment (processing (0-1)).

$$S'(\vec{x}) = \frac{\int_{|\vec{x}'-\vec{x}| \leq 2r_{th}} S(\vec{x}') \exp\left(-\frac{|S(\vec{x}')-S(\vec{x})|^2}{\sigma_{th}^2} \cdot \frac{|\vec{x}'-\vec{x}|^2}{r_{th}^2}\right) d\vec{x}'}{\int_{|\vec{x}'-\vec{x}| \leq 2r_{th}} \exp\left(-\frac{|S(\vec{x}')-S(\vec{x})|^2}{\sigma_{th}^2} \cdot \frac{|\vec{x}'-\vec{x}|^2}{r_{th}^2}\right) d\vec{x}'}$$

[Expression 25]

While it is desirable to assume a value of, for instance, 50 for rth and select a pixel range of approximately 101×101 in order to achieve a truly clean noise removal effect, the following explanation is provided by assuming, for purposes of simplification, that rth=12 and that the integration is executed over a pixel range of 25×25. However, if the processing is executed by using a σ filter or a ε filter that is not affected by any spatial factor, there is no parameter equivalent to rth and thus, only the integrating range needs to be set.

2-2 Noise Extraction Processing

The noise extraction processing is executed as expressed below (processing (0-2)).

$$N(\vec{x})=S(\vec{x})-S'(\vec{x})$$ [Expression 26]

3 Statistical Verification of the Noise Signal (Noise Refining by the Noise Itself)

The noise extraction results are statistically examined as expressed below so as to determine whether or not the noise extraction results demonstrate behavior likely to be attributed to noise, and the noise is thus refined as in the first embodiment (processing (0-6)).

$$N'(\vec{x}) = N(\vec{x}) \cdot \exp\left(-\frac{N(\vec{x})^2}{\sigma_{Nth}^2}\right)$$ [Expression 27]

$\sigma_{Nth}$ in the expression above should take on a value 3~5 times or 6 times the noise fluctuation index value $\sigma_{th}$ used in conjunction with the actual spatial plane, as in the first embodiment. Namely, a noise model identical to that used in the noise removal filter is also used in the noise refining processing in the embodiment.

4 Actual Noise Removal Processing

The noise is removed (processing (0-8)) by subtracting the noise component N' resulting from the noise refining from the initial image S. The processing is executed with a noise removal rate λ (processing (0-9)) so as to afford a higher degree of freedom in consideration of the ultimate appearance of the image resulting from the noise removal.

$$\tilde{S}(\vec{x})=S(\vec{x})-\lambda \cdot N'(\vec{x})$$ [Expression 28]

λ=const.

The processing described above is individually executed for the luminance plane and the chrominance planes.

5 Reverse Color Space Conversion

Processing identical to that executed in the first embodiment as described in "7 Reverse color space conversion" is executed.

6 Image Output

Processing identical to that executed in the first embodiment as described in "8 Image output" is executed.

While an image having been filtered through a very large noise removal filter in the actual space still tends to end up looking flat, better gradation fidelity is assured through the embodiment in which the data at each pixel simply undergo nonlinear conversion once based upon a noise model commonly shared with the noise removal filters. Namely, the issue of the singular edge component erroneously being handled as noise and removed, to result in a flat image, is addressed even in the very basic processing executed in the actual space without adopting the multiresolution technology. Under normal circumstances, an image undergoing processing executed in the actual space, instead of being projected into the optimal frequency space to undergo processing therein, tends to be rendered as a flat image and requires rigorous measures for improvement. The processing executed in the embodiment is bound to bring about such an improvement.

Through the first~sixth embodiments described above, highly advanced noise removal technologies assuring a high level of image quality including textural sharpness and a three-dimensional sense of depth, are provided.

In the first~sixth embodiments described above, the noise component having been extracted through the edge-preserving smoothing filter is examined to determine whether or not the noise component demonstrates the appropriate characteristics of a random noise component and adjusts the condition of the extracted noise component so as to approximate the characteristics of the random noise component. As a result, noise removal assuring a high level of reproducible image quality is achieved by optimally excluding the edge component that has not been completely separated from the noise component through the edge-preserving smoothing filter.

Namely, the edge component and the noise component are distinguished from each other with respect to both the gradation aspect and the spatial aspect, thereby making it possible to accurately extract the noise component alone containing no edge component, from any image structure. The noise in the luminance component is removed by retaining the sense of depth and sharpness, whereas the noise in the chrominance components is removed by assuring a high level of color fidelity. Thus, very fine noise removal, assuring good overall image quality, is enabled.

In addition, the noise refining processing executed to assure desirable gradation fidelity is an extremely simple process whereby the noise component having been extracted through the noise removal filter simply undergoes nonlinear conversion once based upon the common noise model, making it possible to improve on the noise removal technologies in the related art with ease simply by incorporating a minor function.

(Variations)

It is to be noted that the image processing space described in reference to the first~sixth embodiments simply represents an example of an optimal color space, and the advantages of the present invention may be achieved in noise removal executed in a color space in the related art without losing any of its efficacy. For instance, the present invention may be adopted in processing executed in the latest uniform color space, the CIECAM02.

Figure 8:
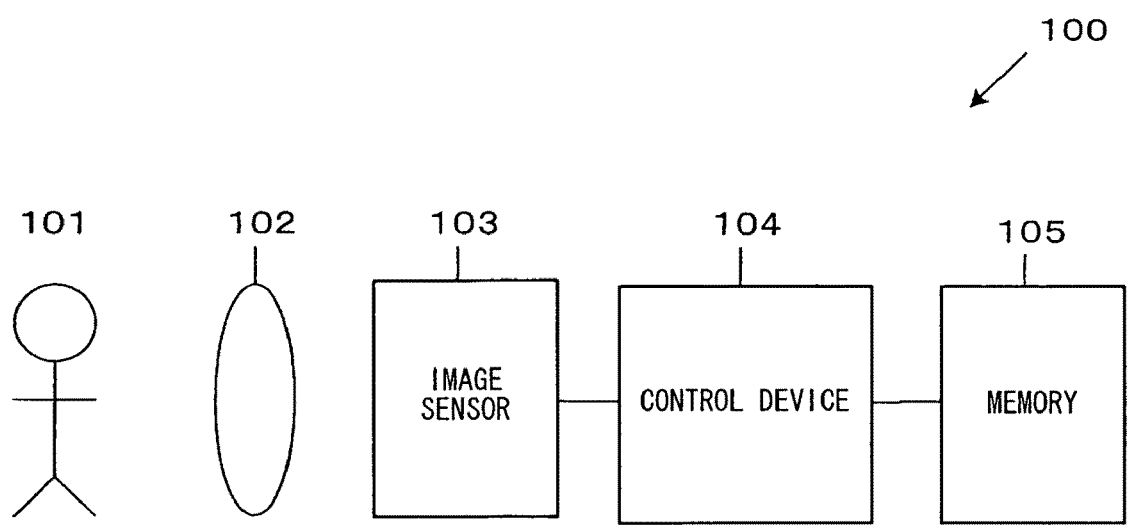
FIG. 8 shows the structure adopted in the digital camera 100.

An explanation has been given above in reference to the embodiments on an example in which the image processing apparatus is constituted with a personal computer 1. However, the noise removal processing executed in the personal computer 1 in the description provided above may instead be executed in a digital camera (electronic camera). FIG. 8 shows the structure of such a digital camera 100. The digital camera 100 includes a photographic lens 102, an image sensor 103 constituted with a CCD or the like, a control device 104 constituted with a CPU and peripheral circuits, a memory 105 and the like.

The image sensor 103 photographs (captures an image of) a subject 101 via the photographic lens 102 and outputs image data obtained through the photographing operation to the control device 104. This processing is equivalent to the image data input executed in step S1 in FIG. 2 in reference to which the first embodiment has been described. The control device 104 executes the noise removal processing in any of the embodiments or their variations having been described earlier on the image data obtained through the photographing operation executed at the image sensor 103 and stores the image data resulting from the optimal noise removal into the memory 105 as needed. The control device 104 executes the noise removal processing described earlier based upon a specific program stored in a ROM (not shown) or the like.

As described above, noise removal assuring a high level of reproducible image quality is enabled in the digital camera 100 and the image data resulting from the optimal noise removal can then be stored into the memory 105 and recorded into a recording medium such as a detachable memory card.

While the invention has been particularly shown and described with respect to the embodiments and variations thereof by referring to the attached drawings, the present invention is not limited to these examples and it will be understood by those skilled in the art that various changes in form and detail may be made therein without departing from the spirit, scope and teaching of the invention.

What is claimed is:

1. An image processing method for removing a noise component contained in an original image, comprising:
    smoothing a noise component contained in an original image on a temporary basis by using a noise fluctuation index value;
    extracting a temporary noise component free of a non-noise component based upon a differential signal representing a difference between the original image and a smoothed image;
    extracting an actual noise component by further excluding a component less likely to be a noise component from the extracted temporary noise component by comparing the extracted temporary noise component with the noise fluctuation index value again; and
    removing noise from the original image based upon the extracted actual noise component having been extracted.

2. An image processing method according to claim 1, wherein:
    the noise fluctuation index value is uniquely determined in correspondence to the original image.

3. An image processing method according to claim 1, wherein:
    a probability with which the component less likely to be a noise component is present in the extracted temporary noise component is estimated to be higher when the extracted temporary noise component indicates a greater value relative to the noise fluctuation index value.

4. An image processing method according to claim 3, wherein:
    a mixing ratio of the component less likely to be a noise component is statistically estimated based upon a Gaussian distribution probability assuming an argument represented by a ratio of the extracted temporary noise component and the noise fluctuation index value.

5. An image processing method according to claim 3, wherein:
    the component less likely to be a noise component is eliminated by attenuating the extracted temporary noise component by multiplying the component less likely to be a noise component by the Gaussian distribution probability.

6. An image processing method according to claim 3, wherein:
    a mixing ratio with which the false noise component is present is estimated based upon a Gaussian distribution probability assuming an argument represented by a ratio of the noise component and a value six times the noise fluctuation index value.

7. An image processing method according to claim 1, wherein:
    the original image is a band-limited subband image expressed with multiresolution image representations.

8. An image processing method according to claim 1, wherein:
    the original image is the actual original image expressed in an actual space.

9. An image processing method according to claim 1, wherein:
the original image is smoothed by using a weighted averaging filter assuming a weighting coefficient adjusted in correspondence to a pixel differential value representing a difference between a target pixel and a nearby pixel.

10. An image processing method according to claim 1, wherein:
the original image is smoothed by extracting an edge in the original image, separating a noise component signal contained in an edge component signal and subtracting the noise component signal having been separated from the original image.

11. An image processing method according to claim 1, wherein:
a luminance plane image and a chrominance plane image constitute the original image.

12. An image processing method according to claim 1, wherein:
a uniform index value is used as the noise fluctuation index value irrespective of a brightness level of the original image by converting the original image to an image in a uniform noise space or an image in a uniform color uniform noise space.

13. An image processing method for removing a noise component contained in an original image, comprising:
adaptively smoothing a noise component contained in an original image by distinguishing the noise component from an edge component present within a smoothing target area through comparison of a noise fluctuation index value and a spatial fluctuation width over which original image signals fluctuate;
extracting a temporary noise component based upon a differential signal representing a difference between the original image and an image resulting from adaptive smoothing;
statistically re-examining a distribution of the temporary noise component having been extracted by comparing the extracted temporary noise component with the noise fluctuation index value again;
extracting an actual noise component by further excluding a component less likely to be a noise component from the extracted temporary noise component based upon examination results; and
removing noise from the original image based upon the actual noise component having been extracted.

14. An image processing method for removing a noise component contained in an original image, comprising:
smoothing an original image by using a specific noise model having a distribution function;
extracting a temporary noise component based upon a differential signal representing a difference between the original image and the image having been smoothed;
estimating a quantity of false noise component present in the temporary noise component having been extracted by comparing a value indicated for the temporary noise component with the distribution function of the specific noise model;
extracting an actual noise component by excluding the false noise component in the estimated quantity from the temporary noise component; and
removing noise from the original image based upon the actual noise component having been extracted.

15. An image processing method according to claim 14, wherein:
the distribution function of the specific noise model used in extraction of the temporary noise component and the distribution function of the noise model used in estimation of the quantity of the false noise component are common distribution functions interlocking with each other by assuming a single fluctuation index value.

16. An image processing method according to claim 15, wherein:
the quantity of false noise component present in the temporary noise component is estimated by determining whether or not the value of the noise component is greater than the fluctuation index value.

17. An image processing method according to claim 14, wherein:
the distribution function used in the specific noise model is a Gaussian distribution model with Gaussian noise distributed over a reference width represented by the fluctuation index value.

18. An image processing method according to claim 14, wherein:
the distribution function used in the specific noise model is a threshold value distribution model with noise distributed in a pattern represented by a stepped function with the fluctuation index value defining a cutoff point.

19. An image processing method for removing a noise component contained in an original image, comprising:
generating a plurality of band-limited images assuming gradually lowered resolution levels by filtering the original image;
extracting a noise component free of a non-noise component in each band-limited image by executing noise removal processing by comparing the band-limited image with a noise fluctuation index value determined in correspondence to the band-limited image;
synthesizing noise component signals having been extracted from the band-limited images to generate a noise component assuming a resolution level matching the resolution level of the original image;
estimating a quantity of a false noise component present in the synthesized noise component by comparing a level of the synthesized noise component with the noise fluctuation index value determined in correspondence to the original image again;
extracting an actual noise component by excluding the false noise component from the synthesized noise component based upon estimation results; and
removing noise from the original image based upon the actual noise component having been extracted.

20. An image processing method according to claim 19, wherein:
a probability of the false noise component being present in the synthesized noise component is estimated to be higher when a level of the synthesized noise component is higher relative to the noise fluctuation index value determined uniquely in correspondence to the original image.

21. An image processing method according to claim 20, wherein:
a mixing ratio with which the false noise component is present in the synthesized noise component is statistically estimated based upon a Gaussian distribution probability assuming an argument represented by a ratio of the synthesized noise component and the noise fluctuation index value uniquely determined in correspondence to the original image.

22. An image processing method according to claim 20, wherein:
the false noise component is excluded by attenuating the false noise component by multiplying the synthesized noise component by the Gaussian distribution probability.

23. An image processing method according to claim 19, wherein:
the plurality of band-limited images make up a set of high-frequency subband images and low-frequency subband images, assuming sequentially lowered resolution levels; and
the synthesized noise component is generated by synthesizing noise component signals extracted from two types of band-limited images at each of the resolution levels.

24. An image processing method for removing noise component contained in an original image, comprising:
generating a plurality of band-limited images assuming gradually lowered resolution levels by filtering the original image;
extracting a noise component free of a non-noise component in each band-limited image by executing noise removal processing by comparing the band-limited image with a noise fluctuation index value determined in correspondence to the band-limited image;
synthesizing noise component signals having been extracted from the band-limited images to generate a noise component assuming a resolution level matching the resolution level of the original image;
estimating a quantity of a false noise component present in the synthesized noise component by comparing a level of the synthesized noise component with the noise fluctuation index value determined in correspondence to the original image again;
extracting an actual noise component by excluding the false noise component from the synthesized noise component based upon estimation results;
removing noise from the original image based upon the actual noise component having been extracted;
estimating the quantity of false noise component present in the noise component by comparing the level of the noise component free of a non-noise component, having been extracted in correspondence to each of the band-limited images, with the noise fluctuation index value determined in correspondence to the band-limited image again;
extracting the actual noise component in each band-limited image by excluding the false noise component from the noise component based upon estimation results; and
synthesizing individual actual noise component signals having been extracted so that verification is executed to exclude the false noise component twice by excluding the false noise component in each band-limited image prior to noise component synthesis and also by excluding the false noise component at a resolution level matching the resolution of the original image following the noise component synthesis.

* * * * *